(12) United States Patent
Held

(10) Patent No.: US 11,187,112 B2
(45) Date of Patent: Nov. 30, 2021

(54) SYSTEMS AND METHODS FOR GENERATING ELECTRICITY VIA A PUMPED THERMAL ENERGY STORAGE SYSTEM

(71) Applicant: ECHOGEN POWER SYSTEMS LLC, Akron, OH (US)

(72) Inventor: Timothy Held, Akron, OH (US)

(73) Assignee: ECHOGEN POWER SYSTEMS LLC, Akron, OH (US)

(*) Notice: Subject to any disclaimer, the term of this patent is extended or adjusted under 35 U.S.C. 154(b) by 108 days.

(21) Appl. No.: 16/453,739

(22) Filed: Jun. 26, 2019

(65) Prior Publication Data

US 2020/0003081 A1    Jan. 2, 2020

Related U.S. Application Data

(60) Provisional application No. 62/690,803, filed on Jun. 27, 2018.

(51) Int. Cl.
*F01K 3/12* (2006.01)
*F01K 3/08* (2006.01)
(Continued)

(52) U.S. Cl.
CPC .............. *F01K 3/12* (2013.01); *F01K 3/08* (2013.01); *F01K 7/165* (2013.01); *F01K 7/38* (2013.01);
(Continued)

(58) Field of Classification Search
CPC . Y02E 60/14; F02C 1/10; F02C 1/105; F28D 20/00–028
See application file for complete search history.

(56) References Cited

U.S. PATENT DOCUMENTS 1,433,883 A   10/1922   Friderich
1,969,526 A    2/1934   Rosch
(Continued)

FOREIGN PATENT DOCUMENTS

CA   2794150 A1   11/2011
CN   1165238 A    11/1997
(Continued)

OTHER PUBLICATIONS

Alpy, N., et al., "French Atomic Energy Commission views as regards SCO2 Cycle Development priorities and related R&D approach," Presentation, Symposium on SC02 Power Cycles, Apr. 29-30, 2009, Troy, NY, 20 pages.
(Continued)

*Primary Examiner* — Laert Dounis
(74) *Attorney, Agent, or Firm* — Nolte Lackenbach Siegel

(57) ABSTRACT

Systems and methods are provided for charging a pumped thermal energy storage ("PTES") system. A system may include a compressor or pump configured to circulate a working fluid within a fluid circuit, wherein the working fluid enters the pump at a first pressure and exits at a second pressure; a first heat exchanger through which the working fluid circulates in use; a second heat exchanger through which the working fluid circulates in use; a third heat exchanger through which the working fluid circulates in use, a turbine positioned between the first heat exchanger and the second heat exchanger, configured to expand the working fluid to the first pressure; a high temperature reservoir connected to the first heat exchanger; a low temperature reservoir connected to the second heat exchanger, and a waste heat reservoir connected to the third heat exchanger.

16 Claims, 8 Drawing Sheets

(51) Int. Cl.
*F01K 7/16* (2006.01)
*F01K 19/00* (2006.01)
*F28D 17/04* (2006.01)
*F01K 13/00* (2006.01)
*F01K 7/38* (2006.01)
*F01K 23/02* (2006.01)
*F02C 1/10* (2006.01)
*F28D 20/00* (2006.01)

(52) U.S. Cl.
CPC .............. *F01K 13/00* (2013.01); *F01K 19/00* (2013.01); *F01K 23/02* (2013.01); *F02C 1/10* (2013.01); *F28D 17/04* (2013.01); *F28D 2020/006* (2013.01); *Y02E 60/14* (2013.01)

(56) References Cited

U.S. PATENT DOCUMENTS

| | | |
|---|---|---|
| 2,575,478 A | 11/1951 | Wilson |
| 2,634,375 A | 4/1953 | Guimbal |
| 2,691,280 A | 10/1954 | Albert |
| 3,095,274 A | 6/1963 | Crawford |
| 3,105,748 A | 10/1963 | Stahl |
| 3,118,277 A | 1/1964 | Wormser |
| 3,237,403 A | 3/1966 | Feher |
| 3,277,955 A | 10/1966 | Laszlo |
| 3,310,954 A | 3/1967 | Sijtstra et al. |
| 3,401,277 A | 9/1968 | Larson |
| 3,620,584 A | 11/1971 | Rosensweig |
| 3,622,767 A | 11/1971 | Koepcke |
| 3,630,022 A | 12/1971 | Jubb |
| 3,736,745 A | 6/1973 | Karig |
| 3,772,879 A | 11/1973 | Engdahl |
| 3,791,137 A | 2/1974 | Jubb |
| 3,828,610 A | 8/1974 | Swearingen |
| 3,830,062 A | 8/1974 | Morgan et al. |
| 3,831,381 A | 8/1974 | Swearingen |
| 3,939,328 A | 2/1976 | Davis |
| 3,971,211 A | 7/1976 | Wethe |
| 3,977,197 A | 8/1976 | Brantley, Jr. |
| 3,982,379 A | 9/1976 | Gilli |
| 3,986,359 A | 10/1976 | Manning et al. |
| 3,991,588 A | 11/1976 | Laskaris |
| 3,998,058 A | 12/1976 | Park |
| 4,003,786 A | 1/1977 | Cahn |
| 4,005,580 A | 2/1977 | Swearingen |
| 4,009,575 A | 3/1977 | Hartman, Jr. |
| 4,015,962 A | 4/1977 | Tompkins |
| 4,029,255 A | 6/1977 | Heiser |
| 4,030,312 A | 6/1977 | Wallin |
| 4,037,413 A | 7/1977 | Heller et al. |
| 4,049,407 A | 9/1977 | Bottum |
| 4,070,870 A | 1/1978 | Bahel |
| 4,071,897 A | 1/1978 | Groves, Jr. et al. |
| 4,089,744 A | 5/1978 | Cahn |
| 4,099,381 A | 7/1978 | Rappoport |
| 4,110,987 A | 9/1978 | Cahn et al. |
| 4,119,140 A | 10/1978 | Cates |
| 4,150,547 A | 4/1979 | Hobson |
| 4,152,901 A | 5/1979 | Munters |
| 4,164,848 A | 8/1979 | Gilli |
| 4,164,849 A | 8/1979 | Mangus |
| 4,170,435 A | 10/1979 | Swearingen |
| 4,178,762 A | 12/1979 | Binstock et al. |
| 4,182,960 A | 1/1980 | Reuyl |
| 4,183,220 A | 1/1980 | Shaw |
| 4,198,827 A | 4/1980 | Terry et al. |
| 4,208,882 A | 6/1980 | Lopes |
| 4,221,185 A | 9/1980 | Scholes |
| 4,233,085 A | 11/1980 | Roderick |
| 4,236,869 A | 12/1980 | Laurello |
| 4,245,476 A | 1/1981 | Shaw |
| 4,248,049 A | 2/1981 | Briley |
| 4,257,232 A | 3/1981 | Bell |
| 4,285,203 A | 8/1981 | Vakil |
| 4,287,430 A | 9/1981 | Guido |
| 4,336,692 A | 6/1982 | Ecker |
| 4,347,711 A | 9/1982 | Noe |
| 4,347,714 A | 9/1982 | Kinsell |
| 4,364,239 A | 12/1982 | Chappelle et al. |
| 4,372,125 A | 2/1983 | Dickenson |
| 4,374,467 A | 2/1983 | Briley |
| 4,384,568 A | 5/1983 | Palmatier |
| 4,390,082 A | 6/1983 | Swearingen |
| 4,391,101 A | 7/1983 | Labbe |
| 4,420,947 A | 12/1983 | Yoshino |
| 4,428,190 A | 1/1984 | Bronicki |
| 4,433,554 A | 2/1984 | Rojey |
| 4,439,687 A | 3/1984 | Wood |
| 4,439,994 A | 4/1984 | Briley |
| 4,445,180 A | 4/1984 | Davis |
| 4,448,033 A | 5/1984 | Briccetti |
| 4,450,363 A | 5/1984 | Russell |
| 4,455,836 A | 6/1984 | Binstock |
| 4,467,609 A | 8/1984 | Loomis |
| 4,467,621 A | 8/1984 | O'Brien |
| 4,471,622 A | 9/1984 | Kuwahara |
| 4,475,353 A | 10/1984 | Lazare |
| 4,489,562 A | 12/1984 | Snyder |
| 4,489,563 A | 12/1984 | Kalina |
| 4,498,289 A | 2/1985 | Osgerby |
| 4,507,936 A | 4/1985 | Yoshino |
| 4,516,403 A | 5/1985 | Tanaka |
| 4,538,960 A | 9/1985 | Iino et al. |
| 4,549,401 A | 10/1985 | Spliethoff |
| 4,555,905 A | 12/1985 | Endou |
| 4,558,228 A | 12/1985 | Larjola |
| 4,573,321 A | 3/1986 | Knaebel |
| 4,578,953 A | 4/1986 | Krieger |
| 4,589,255 A | 5/1986 | Martens |
| 4,636,578 A | 1/1987 | Feinberg |
| 4,665,975 A | 5/1987 | Johnson |
| 4,674,297 A | 6/1987 | Vobach |
| 4,694,189 A | 9/1987 | Haraguchi |
| 4,697,981 A | 10/1987 | Brown et al. |
| 4,700,543 A | 10/1987 | Krieger |
| 4,730,977 A | 3/1988 | Haaser |
| 4,756,162 A | 7/1988 | Dayan |
| 4,765,143 A | 8/1988 | Crawford |
| 4,773,212 A | 9/1988 | Griffin |
| 4,798,056 A | 1/1989 | Franklin |
| 4,813,242 A | 3/1989 | Wicks |
| 4,821,514 A | 4/1989 | Schmidt |
| 4,867,633 A | 9/1989 | Gravelle |
| 4,884,942 A | 12/1989 | Pennink |
| 4,888,954 A | 12/1989 | Silvestri, Jr. |
| 4,892,459 A | 1/1990 | Guelich |
| 4,986,071 A | 1/1991 | Voss |
| 4,993,483 A | 2/1991 | Harris |
| 5,000,003 A | 3/1991 | Wicks |
| 5,050,375 A | 9/1991 | Dickinson |
| 5,080,047 A | 1/1992 | Williams et al. |
| 5,083,425 A | 1/1992 | Hendriks et al. |
| 5,098,194 A | 3/1992 | Kuo |
| 5,102,295 A | 4/1992 | Pope |
| 5,104,284 A | 4/1992 | Hustak, Jr. |
| 5,164,020 A | 11/1992 | Wagner |
| 5,176,321 A | 1/1993 | Doherty |
| 5,203,159 A | 4/1993 | Koizumi et al. |
| 5,228,310 A | 7/1993 | Vandenberg |
| 5,248,239 A | 9/1993 | Andrews |
| 5,291,509 A | 3/1994 | Mizoguchi et al. |
| 5,291,960 A | 3/1994 | Brandenburg |
| 5,320,482 A | 6/1994 | Palmer et al. |
| 5,321,944 A | 6/1994 | Bronicki et al. |
| 5,335,510 A | 8/1994 | Rockenfeller |
| 5,358,378 A | 10/1994 | Holscher |
| 5,360,057 A | 11/1994 | Rockenfeller |
| 5,384,489 A | 1/1995 | Bellac |
| 5,392,606 A | 2/1995 | Labinov |
| 5,440,882 A | 8/1995 | Kalina |
| 5,444,972 A | 8/1995 | Moore |
| 5,483,797 A | 1/1996 | Rigal et al. |
| 5,487,822 A | 1/1996 | Demaray et al. |

(56) References Cited

U.S. PATENT DOCUMENTS

| | | |
|---|---|---|
| 5,488,828 A | 2/1996 | Brossard |
| 5,490,386 A | 2/1996 | Keller |
| 5,503,222 A | 4/1996 | Dunne |
| 5,531,073 A | 7/1996 | Bronicki |
| 5,538,564 A | 7/1996 | Kaschmitter |
| 5,542,203 A | 8/1996 | Luoma |
| 5,544,479 A | 8/1996 | Yan et al. |
| 5,570,578 A | 11/1996 | Saujet |
| 5,588,298 A | 12/1996 | Kalina |
| 5,600,967 A | 2/1997 | Meckler |
| 5,609,465 A | 3/1997 | Batson et al. |
| 5,634,340 A | 6/1997 | Grennan |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,685,152 A | 11/1997 | Sterling |
| 5,704,206 A | 1/1998 | Kaneko et al. |
| 5,738,164 A | 4/1998 | Hildebrand |
| 5,754,613 A | 5/1998 | Hashiguchi |
| 5,771,700 A | 6/1998 | Cochran |
| 5,782,081 A | 7/1998 | Pak et al. |
| 5,789,822 A | 8/1998 | Calistrat |
| 5,799,490 A | 9/1998 | Bronicki et al. |
| 5,813,215 A | 9/1998 | Weisser |
| 5,833,876 A | 11/1998 | Schnur |
| 5,862,666 A | 1/1999 | Liu |
| 5,873,260 A | 2/1999 | Linhardt |
| 5,874,039 A | 2/1999 | Edelson |
| 5,884,470 A | 3/1999 | Frutschi |
| 5,894,836 A | 4/1999 | Wu |
| 5,899,067 A | 5/1999 | Hageman |
| 5,901,783 A | 5/1999 | Dobak, III et al. |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,954,342 A | 9/1999 | Mikhalev et al. |
| 5,973,050 A | 10/1999 | Johnson |
| 6,037,683 A | 3/2000 | Lulay |
| 6,041,604 A | 3/2000 | Nicodemus |
| 6,058,695 A | 5/2000 | Ranasinghe |
| 6,058,930 A | 5/2000 | Shingleton |
| 6,059,450 A | 5/2000 | McClure |
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |
| 6,164,655 A | 12/2000 | Bothien |
| 6,202,782 B1 | 3/2001 | Hatanaka |
| 6,223,846 B1 | 5/2001 | Schechter |
| 6,233,938 B1 | 5/2001 | Nicodemus |
| 6,233,955 B1 | 5/2001 | Egara |
| 6,282,900 B1 | 9/2001 | Bell |
| 6,282,917 B1 | 9/2001 | Mongan |
| 6,295,818 B1 | 10/2001 | Ansley |
| 6,298,653 B1 | 10/2001 | Lawlor |
| 6,299,690 B1 | 10/2001 | Mongeon |
| 6,341,781 B1 | 1/2002 | Matz |
| 6,347,520 B1 | 2/2002 | Ranasinghe et al. |
| 6,374,630 B1 | 4/2002 | Jones |
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,490,812 B1 | 12/2002 | Bennett et al. |
| 6,530,224 B1 | 3/2003 | Conchieri |
| 6,539,720 B2 | 4/2003 | Rouse et al. |
| 6,539,728 B2 | 4/2003 | Korin |
| 6,563,855 B1 | 5/2003 | Nishi et al. |
| 6,571,548 B1 | 6/2003 | Bronicki |
| 6,581,384 B1 | 6/2003 | Benson |
| 6,588,499 B1 | 7/2003 | Fahlsing |
| 6,598,397 B2 | 7/2003 | Hanna |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan et al. |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,892,522 B2 | 5/2005 | Brasz et al. |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,962,056 B2 | 11/2005 | Brasz et al. |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,553 B2 | 4/2006 | Johnston |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,343,746 B2 | 3/2008 | Pierson |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 | 10/2009 | Kalina |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,673,681 B2 | 3/2010 | Vinegar et al. |
| 7,685,820 B2 | 3/2010 | Litwin et al. |
| 7,685,821 B2 | 3/2010 | Kalina |

(56) References Cited

U.S. PATENT DOCUMENTS

| | | |
|---|---|---|
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,971,424 B2 | 7/2011 | Masada |
| 7,972,529 B2 | 7/2011 | Machado |
| 7,997,076 B2 | 8/2011 | Ernst |
| 8,015,790 B2 | 9/2011 | Zhang et al. |
| 8,096,128 B2 | 1/2012 | Held et al. |
| 8,099,198 B2 | 1/2012 | Gurin |
| 8,099,972 B2 | 1/2012 | Dupraz |
| 8,146,360 B2 | 4/2012 | Myers |
| 8,235,647 B2 | 8/2012 | Pisseloup et al. |
| 8,281,593 B2 | 10/2012 | Held |
| 8,289,710 B2 | 10/2012 | Spearing et al. |
| 8,297,065 B2 | 10/2012 | Vaisman et al. |
| 8,375,719 B2 | 2/2013 | Rhodes et al. |
| 8,387,248 B2 | 3/2013 | Rolt et al. |
| 8,419,936 B2 | 4/2013 | Berger et al. |
| 8,544,274 B2 | 10/2013 | Ernst |
| 8,584,463 B2 | 11/2013 | Hemrle et al. |
| 8,613,195 B2 | 12/2013 | Held et al. |
| 8,661,820 B2 | 3/2014 | Mak |
| 8,813,497 B2 | 8/2014 | Hart et al. |
| 8,820,083 B2 | 9/2014 | Davidson et al. |
| 8,869,531 B2 | 10/2014 | Held |
| 8,973,398 B2 | 3/2015 | Coyle |
| 9,038,390 B1 | 5/2015 | Kreuger |
| 9,180,421 B2 | 11/2015 | Kwang et al. |
| 9,523,312 B2 | 12/2016 | Allam et al. |
| 9,638,065 B2 | 5/2017 | Vermeersch et al. |
| 9,810,451 B2 | 11/2017 | O'Donnell et al. |
| 9,845,667 B2 | 12/2017 | Mokheimer et al. |
| 9,874,112 B2 | 1/2018 | Giegel |
| 9,932,861 B2 | 4/2018 | Preuss et al. |
| 10,077,683 B2 | 9/2018 | Close |
| 2001/0015061 A1 | 8/2001 | Viteri et al. |
| 2001/0020444 A1 | 9/2001 | Johnston |
| 2001/0027642 A1 | 10/2001 | Tsuji |
| 2001/0030952 A1 | 10/2001 | Roy |
| 2002/0029558 A1 | 3/2002 | Tamaro |
| 2002/0053196 A1 | 5/2002 | Lerner et al. |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2002/0148225 A1 | 10/2002 | Lewis |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2004/0247211 A1 | 12/2004 | Hamke |
| 2005/0022963 A1 | 2/2005 | Garrabrant et al. |
| 2005/0056001 A1 | 3/2005 | Frutschi |
| 2005/0072182 A1 | 4/2005 | Taniguchi et al. |
| 2005/0096676 A1 | 5/2005 | Gifford, III et al. |
| 2005/0109387 A1 | 5/2005 | Marshall |
| 2005/0118025 A1 | 6/2005 | Hiegemann et al. |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2005/0262848 A1 | 12/2005 | Joshi et al. |
| 2005/0276685 A1 | 12/2005 | Wiggins et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0112702 A1 | 6/2006 | Martin et al. |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0222523 A1 | 10/2006 | Valentian et al. |
| 2006/0225421 A1 | 10/2006 | Yamanaka et al. |
| 2006/0225459 A1 | 10/2006 | Meyer |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0007771 A1 | 1/2007 | Biddle et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie, II |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0134681 A1 | 6/2008 | Nayef et al. |
| 2008/0135253 A1 | 6/2008 | Vinegar et al. |
| 2008/0163618 A1 | 7/2008 | Paul |
| 2008/0163625 A1 | 7/2008 | O'Brien |
| 2008/0173444 A1 | 7/2008 | Stone et al. |
| 2008/0173450 A1 | 7/2008 | Goldberg et al. |
| 2008/0174115 A1 | 7/2008 | Lambirth |
| 2008/0211230 A1 | 9/2008 | Gurin |
| 2008/0217321 A1 | 9/2008 | Vinegar et al. |
| 2008/0250789 A1 | 10/2008 | Myers et al. |
| 2008/0252078 A1 | 10/2008 | Myers |
| 2008/0282702 A1 | 11/2008 | Collins |
| 2008/0282715 A1 | 11/2008 | Aue et al. |
| 2009/0021251 A1 | 1/2009 | Simon |
| 2009/0071156 A1 | 3/2009 | Nishikawa et al. |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |

(56) References Cited

U.S. PATENT DOCUMENTS

| | | |
|---|---|---|
| 2009/0179429 A1 | 7/2009 | Ellis et al. |
| 2009/0180903 A1 | 7/2009 | Martin et al. |
| 2009/0205892 A1 | 8/2009 | Jensen et al. |
| 2009/0211251 A1 | 8/2009 | Peterson et al. |
| 2009/0211253 A1 | 8/2009 | Radcliff et al. |
| 2009/0257902 A1 | 10/2009 | Ernens |
| 2009/0266075 A1 | 10/2009 | Westmeier et al. |
| 2009/0293503 A1 | 12/2009 | Vandor |
| 2009/0320477 A1 | 12/2009 | Juchymenko |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0143094 A1 | 6/2010 | Pisseloup et al. |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0212316 A1 | 8/2010 | Waterstripe et al. |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287920 A1 | 11/2010 | Duparchy |
| 2010/0287934 A1 | 11/2010 | Glynn et al. |
| 2010/0300093 A1 | 12/2010 | Doty |
| 2010/0319346 A1 | 12/2010 | Ast et al. |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0051880 A1 | 3/2011 | Al-Mayahi et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0100002 A1 | 5/2011 | Muir et al. |
| 2011/0100611 A1 | 5/2011 | Ohler et al. |
| 2011/0113781 A1 | 5/2011 | Frey et al. |
| 2011/0164957 A1 | 7/2011 | Rivas et al. |
| 2011/0179799 A1 | 7/2011 | Allam et al. |
| 2011/0185729 A1 | 8/2011 | Held |
| 2011/0192163 A1 | 8/2011 | Kasuya |
| 2011/0203278 A1 | 8/2011 | Kopecek et al. |
| 2011/0214424 A1 | 9/2011 | Wood |
| 2011/0219760 A1 | 9/2011 | McBride et al. |
| 2011/0259010 A1 | 10/2011 | Bronicki et al. |
| 2011/0270451 A1 | 11/2011 | Sakaguchi et al. |
| 2011/0286724 A1 | 11/2011 | Goodman |
| 2011/0288688 A1 | 11/2011 | Lehan |
| 2011/0299972 A1 | 12/2011 | Morris |
| 2011/0308253 A1 | 12/2011 | Ritter |
| 2012/0042650 A1 | 2/2012 | Ernst et al. |
| 2012/0047892 A1 | 3/2012 | Held et al. |
| 2012/0055153 A1 | 3/2012 | Murata et al. |
| 2012/0067046 A1 | 3/2012 | Drenik et al. |
| 2012/0067055 A1 | 3/2012 | Held |
| 2012/0080161 A1* | 4/2012 | Kelly ............... F28D 20/00 165/10 |
| 2012/0111003 A1 | 5/2012 | Kasuya et al. |
| 2012/0125002 A1 | 5/2012 | Lehar et al. |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0167873 A1 | 7/2012 | Venetos et al. |
| 2012/0174558 A1 | 7/2012 | Gurin |
| 2012/0186219 A1 | 7/2012 | Gurin |
| 2012/0240616 A1 | 9/2012 | Ritter et al. |
| 2012/0247134 A1 | 10/2012 | Gurin |
| 2012/0247455 A1 | 10/2012 | Gurin et al. |
| 2012/0255304 A1 | 10/2012 | Li et al. |
| 2012/0261090 A1 | 10/2012 | Durmaz et al. |
| 2012/0261104 A1 | 10/2012 | Kelly et al. |
| 2012/0306206 A1 | 12/2012 | Agrawal et al. |
| 2012/0319410 A1 | 12/2012 | Ambrosek et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0074497 A1 | 3/2013 | Mori et al. |
| 2013/0087301 A1 | 4/2013 | Hemrle et al. |
| 2013/0113221 A1 | 5/2013 | Held |
| 2013/0134720 A1 | 5/2013 | Fukasaku et al. |
| 2013/0145759 A1 | 6/2013 | Sonwane et al. |
| 2014/0041387 A1 | 2/2014 | Benson |
| 2014/0090405 A1 | 4/2014 | Held et al. |
| 2014/0102098 A1 | 4/2014 | Bowan et al. |
| 2014/0102103 A1 | 4/2014 | Yamamoto et al. |
| 2014/0150992 A1 | 6/2014 | Koontz et al. |
| 2014/0208750 A1 | 7/2014 | Vermeersch |
| 2014/0208751 A1 | 7/2014 | Bowan |
| 2014/0216034 A1 | 8/2014 | Numata et al. |
| 2014/0223907 A1 | 8/2014 | Fujioka et al. |
| 2014/0224447 A1 | 8/2014 | Reznik et al. |
| 2014/0298813 A1* | 10/2014 | Brunhuber ............... F01K 3/006 60/645 |
| 2015/0069758 A1 | 3/2015 | Davidson et al. |
| 2015/0369086 A1 | 12/2015 | Johnson et al. |
| 2016/0017759 A1 | 1/2016 | Gayawal et al. |
| 2016/0040557 A1 | 2/2016 | Vermeersch et al. |
| 2016/0102608 A1 | 4/2016 | Lynn |
| 2016/0237904 A1 | 8/2016 | Scarboro et al. |
| 2017/0058202 A1 | 3/2017 | Noureldin et al. |
| 2017/0081980 A1* | 3/2017 | Davidson ............... F01K 3/16 |
| 2017/0350658 A1 | 12/2017 | Kerth et al. |
| 2017/0362963 A1 | 12/2017 | Hostler et al. |
| 2018/0187628 A1 | 7/2018 | Apte |
| 2018/0340712 A1 | 11/2018 | Peter et al. |
| 2019/0170026 A1 | 6/2019 | Matsukuma et al. |
| 2020/0003081 A1 | 1/2020 | Held |

FOREIGN PATENT DOCUMENTS

| | | |
|---|---|---|
| CN | 1432102 A | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1977 |
| DE | 19906087 A1 | 8/2000 |
| DE | 10052993 A1 | 5/2002 |
| DE | 102007020086 B3 | 4/2007 |
| DE | 10 2011005722 B3 | 3/2011 |
| EP | 0003980 A1 | 2/1979 |
| EP | 0286565 A2 | 4/1988 |
| EP | 1484489 A2 | 8/2004 |
| EP | 1577549 A1 | 9/2005 |
| EP | 1977174 A2 | 10/2008 |
| EP | 1998013 A2 | 12/2008 |
| EP | 2157317 A2 | 2/2010 |
| EP | 2241737 A1 | 10/2010 |
| EP | 2312129 A1 | 4/2011 |
| EP | 2357324 A2 | 9/2011 |
| EP | 2390473 A1 | 11/2011 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 A1 | 1/2013 |
| EP | 2698506 A1 | 2/2014 |
| GB | 856985 A | 12/1960 |
| GB | 2010974 A | 7/1979 |
| GB | 2075608 A | 11/1981 |
| JP | 58-193051 A | 11/1983 |
| JP | 60-040707 A | 3/1985 |
| JP | 61-152914 A | 7/1986 |
| JP | 01-240705 A | 9/1989 |
| JP | H03182638 A | 8/1991 |
| JP | 05-321612 A | 12/1993 |
| JP | 06-331225 A | 11/1994 |
| JP | 08-028805 A | 2/1996 |

(56) References Cited

FOREIGN PATENT DOCUMENTS

| | | |
|---|---|---|
| JP | 09-100702 A | 4/1997 |
| JP | 2641581 B2 | 5/1997 |
| JP | 09-209716 A | 8/1997 |
| JP | 2858750 B2 | 12/1998 |
| JP | H11-270352 | 5/1999 |
| JP | 2000-257407 A | 9/2000 |
| JP | 3119718 B2 | 12/2000 |
| JP | 2001-193419 A | 7/2001 |
| JP | 2002-097965 A | 4/2002 |
| JP | 2003-529715 A | 10/2003 |
| JP | 2004-239250 A | 8/2004 |
| JP | 2004-332626 A | 11/2004 |
| JP | 2005-030727 A | 2/2005 |
| JP | 2005-533972 A1 | 11/2005 |
| JP | 2006-037760 A | 2/2006 |
| JP | 2006-177266 A | 7/2006 |
| JP | 2007-198200 A | 9/2007 |
| JP | 4343738 B2 | 10/2009 |
| JP | 2011-017268 A | 1/2011 |
| KR | 100191080 | 6/1999 |
| KR | 10 2007 0086244 A | 8/2007 |
| KR | 10-0766101 B1 | 10/2007 |
| KR | 10-0844634 A | 7/2008 |
| KR | 10-20100067927 A | 6/2010 |
| KR | 1020110018769 A | 2/2011 |
| KR | 1069914 B1 | 9/2011 |
| KR | 1103549 B1 | 1/2012 |
| KR | 10-2012-0058582 A | 6/2012 |
| KR | 2012-0068670 A | 6/2012 |
| KR | 2012-0128753 A | 11/2012 |
| KR | 2012-0128755 A | 11/2012 |
| WO | WO 1991/05145 A1 | 4/1991 |
| WO | WO 92/12366 A1 | 7/1992 |
| WO | WO 1996/009500 A1 | 3/1996 |
| WO | WO 00-71944 A1 | 11/2000 |
| WO | WO 2001/044658 A1 | 6/2001 |
| WO | WO 02/090721 A1 | 11/2002 |
| WO | WO 02/090747 A2 | 11/2002 |
| WO | WO 2006/060253 | 6/2006 |
| WO | WO 2006/137957 A1 | 12/2006 |
| WO | WO 2007/056241 A2 | 5/2007 |
| WO | WO 2007/079245 A2 | 7/2007 |
| WO | WO 2007/082103 A2 | 7/2007 |
| WO | WO 2007/112090 A2 | 10/2007 |
| WO | WO 2008014774 A2 | 2/2008 |
| WO | WO 2008/039725 A2 | 4/2008 |
| WO | WO 2008/101711 A2 | 8/2008 |
| WO | WO 2009/045196 A1 | 4/2009 |
| WO | WO 2009/058992 A2 | 5/2009 |
| WO | WO 2010/006942 A1 | 2/2010 |
| WO | WO 2010/017981 A2 | 2/2010 |
| WO | WO 2010/017981 A3 | 2/2010 |
| WO | WO 2010/074173 A1 | 7/2010 |
| WO | WO 2010/083198 A1 | 7/2010 |
| WO | WO 2010/121255 A1 | 10/2010 |
| WO | WO 2010/126980 A2 | 11/2010 |
| WO | WO 2010/151560 A1 | 12/2010 |
| WO | WO 2011/017450 A2 | 2/2011 |
| WO | WO 2011/017476 A1 | 2/2011 |
| WO | WO 2011/017599 A1 | 2/2011 |
| WO | WO 2011/034984 A1 | 3/2011 |
| WO | WO 2011/094294 A2 | 8/2011 |
| WO | WO 2011/119650 A2 | 9/2011 |
| WO | WO 2012/036678 A2 | 3/2012 |
| WO | WO 2012/074905 A2 | 6/2012 |
| WO | WO 2012/074907 A2 | 6/2012 |
| WO | WO 2012/074911 A2 | 6/2012 |
| WO | WO 2012/074940 A2 | 6/2012 |
| WO | WO 2013/055391 A1 | 4/2013 |
| WO | WO 2013/059687 A1 | 4/2013 |
| WO | WO 2013/059695 A1 | 4/2013 |
| WO | WO 2013/070249 A1 | 5/2013 |
| WO | WO 2013/074907 A1 | 5/2013 |
| WO | WO 2014/164620 A1 | 3/2014 |
| WO | WO 2014/114531 A1 | 7/2014 |
| WO | WO 2014/138035 A1 | 9/2014 |
| WO | WO 2014/159520 A1 | 10/2014 |
| WO | WO 2016/150455 A1 | 9/2016 |
| WO | WO 2018/217969 A1 | 11/2018 |
| WO | WO 2020/90721 A1 | 7/2020 |

OTHER PUBLICATIONS

Angeling, G., and Invernizzi, C.M., "Carbon Dioxide Power Cycles using Liquid Natural Gas as Heat Sink", Applied Thermal Engineering Mar. 3, 2009, 43 pages.

Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.

Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.

Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.

Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.

Chen, Yang, "Thermodynamic Cycles Using Carbon Dioxide as Working Fluid", Doctoral Thesis, School of Industrial Engineering and Management, Stockholm, Oct. 2011, 150 pages., (3 parts).

Chinese Search Report for Application No. 201080035382.1, 2 pages.

Chinese Search Report for Application No. 201080050795.7, 2 pages.

Chordia, Lalit, "Optimizing Equipment for Supercritical Applications", Thar Energy LLC, Supercritical CO2 Power Cycle Symposium, May 24-25, 2011, Boulder, CO, 7 pages.

Colegrove, et al., "Structured Steam Turbines for the Combined-Cycle Market", GE Power Systems, GER-4201, 05/01, 18 pages.

Combs, Osie V., "An Investigation of the Supercritical CO2 Cycle (Feher cycle) for Shipboard Application", Massachusetts Institute of Technology, May 1977, 290 pages.

Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.

DOSTAL, V., et al., A Supercritical Carbon Dioxide Cycle for Next Generation Nuclear Reactors, March 10, 2004, 326 pages., (7 parts).

Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, 2009, Troy, NY, 8 pages.

Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.

Ebenezer, Salako A.; "Removal of Carbon Dioxide from Natural Gas for LNG Production", Institute of Petroleum Technology Norwegian University of Science and Technology, Dec. 2005, Trondheim, Norway, 74 pages.

Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.

Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.

Feher, E.G., et al., "Investigation of Supercritical (Feher) Cycle", Astropower Laboratory, Missile & Space Systems Division, Oct. 1968, 152 pages.

(56) References Cited

OTHER PUBLICATIONS

Fuller, Robert L., and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.
Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.
Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.
Gokhstein, D.P.; Taubman, E.I.; Konyaeva, G.P., "Thermodynamic Cycles of Carbon Dioxide Plant with an Additional Turbine After the Regenerator", Energy Citations Database, Mar. 1973, 1 Page, Abstract only.
Gowrishankar, K., "Adaptive Fuzzy Controller to Control Turbine Speed", Rajiv Gandhi College Of Engg. & tech., Puducherry, India, 7 pages.
Hjartarson, Heimir; "Waste Heat Utilization at Elkem Ferrosilicon Plant in Iceland", University of Iceland, 2009, 102 pages.
Hjartarson, et al.; "Waste Heat Utilization from a Submerged ARC Furnace Producing Ferrosilicon", The Twelfth International Ferroalloys Congress Sustainable Future;, Helsinki, Finland ,Jun. 6-9, 2010, 10 pages.
Hejzlar, P. et al., "Assessment of Gas Cooled Gas Reactor with Indirect Supercritical CO2 Cycle" Massachusetts Institute of Technology, Jan. 2006, 10 pages.
Hoffman, John R., and Feher, E.G., "150 kwe Supercritical Closed Cycle System", Transactions of the ASME, Jan. 1971, pp. 70-80.
Jeong, Woo Seok, et al., "Performance of S—CO2 Brayton Cycle with Additive Gases for SFR Application", Korea Advanced Institute of Science and Technology, Supercritical CO2 Power Cycle Symposium, May 24-25, 2011, Boulder, CO, 5 pages.
Johnson, Gregory A., & Mcdowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.
Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).
Kulhanek, Martin, "Thermodynamic Analysis and Comparison of S—CO2 Cycles", Presentation, Czech Technical University in Prague, Supercritical CO2 Power Cycle Symposium, May 24-25, 2011, Boulder, CO, 14 pages.
Kulhanek, Martin, "Thermodynamic Analysis and Comparison of S—CO2 Cycles", Paper, Czech Technical University in Prague, Supercritical CO2 Power Cycle Symposium, May 24-25, 2011, Boulder, CO, 7 pages.
Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.
Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.
Mohamed, Omar, et al., "Modelling Study of Supercritical Power Plant and Parameter Identified Using Genetic Algorithms", Proceedings of the World Congress on Engineering 2010 vol. II, WCE 2010, Jun. 30-Jul. 2, 2010, London, U.K., 6 pages.
Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.
Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.
Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.
Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.
Muto, Yasushi, and Kato, Yasuyoshi, "Optimal Cycle Scheme of Direct Cycle Supercritical CO2 Gas Turbine for Nuclear Power Generation Systems", International Conference on Power Engineering—2007, Oct. 23-27, 2007, Hangzhou, China, pp. 86-87.
Noriega, Bahamonde J.S., "Design Method for s-CO2 Gas Turbine Power Plants", Master of Science Thesis, Delft University of Technology, Oct. 2012, 122 pages., (3 parts).
Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.
Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.
Parma, Ed, et al., "Supercritical CO2 Direct Cycle Gas Fast Reactor (SC-GFR) Concept" Presentation for Supercritical CO2 Power Cycle Symposium, May 24-25, 2011, Boulder, CO, 40 pages.
Parma, Ed, et al., "Supercritical CO2 Direct Cycle Gas Fast Reactor (SC-GFR) Concept", Supercritical CO2 Power Cycle Symposium, May 24-25, 2011, Boulder, CO, 9 pages.
Parma, Edward J., et al., "Supercritical CO2 Direct Cycle Gas Fast Reactor (SC-GFR) Concept", Presentation, Sandia National Laboratories, May 2011, 55 pages.
PCT/US2011/029486—International Preliminary Reporton Patentability dated Sep. 25, 2012, 6 pages.
PCT/US2011/029486—International Search Report and Written Opinion dated Nov. 16, 2011, 9 pages.
PCT/US2010/049042—International Search Report and Written Opinion dated Nov. 17, 2010, 11 pages.
PCT/US2010/049042—International Preliminary Reporton Patentability dated Mar. 29, 2012, 18 pages.
PCT/US2010/031614—International Search Report dated Jul. 12, 2010, 3 pages.
PCT/US2010/031614—International Preliminary Report on Patentability dated Oct. 27, 2011, 9 pages.
PCT/US2010/039559—International Preliminary Reporton Patentability dated Jan. 12, 2012, 7 pages.
PCT/US2010/039559—Notification of Transmittal of the International Search Report and Written Opinion of the International Searching Authority, or the Declaration dated Sep. 1, 2010, 6 pages.
PCT/US2010/044681—International Search Report and Written Opinion dated Oct. 7, 2010, 10 pages.
PCT/US2010/044681—International Preliminary Report on Patentability dated Feb. 16, 2012, 9 pages.
PCT/US2010/044476—International Search Report dated Sep. 29, 2010, 23 pages.
PCT/US2007/001120—International Search Report dated Apr. 25, 2008, 7 pages.
PCT/US2006/049623—Written Opinion of ISA dated Jan. 4, 2008, 4 pages.
PCT/US2007/079318—International Preliminary Report on Patentability dated July 7, 2008, 5 pages.
PCT/US2013/055547—Notification of Transmittal of the International Search Report and the Written Opinion of the International Searching Authority, or the Declaration dated Jan. 24, 2014, 11 pages.
PCT/US2013/064470—Notification of Transmittal of the International Search Report and the Written Opinion of the International Searching Authority, or the Declaration dated Jan. 22, 2014, 10 pages.

(56) References Cited

OTHER PUBLICATIONS

PCT/US2013/064471—Notification of Transmittal of the International Search Report and the Written Opinion of the International Searching Authority, or the Declaration dated Jan. 24, 2014, 10 pages.
PCT/US2014/023026—Notification of Transmittal of the International Search Report and the Written Opinion of the International Searching Authority, or the Declaration dated Jul. 22, 2014, 11 pages.
PCT/US2014/013170—Notification of Transmittal of the International Search Report and the Written Opinion of the International Searching Authority, or the Declaration dated May 9, 2014, 12 pages.
PCT/US2011/062266—International Search Report and Written Opinion dated Jul. 9, 2012, 12 pages.
PCT/US2011/062198—International Search Report and Written Opinion dated Jul. 2, 2012, 9 pages.
PCT/US2011/062198—Extended European Search Report dated May 6, 2014, 9 pages.
PCT/US2011/062201—International Search Report and Written Opinion dated Jun. 26, 2012, 9 pages.
PCT/US2011/062201—Extended European Search Report dated May 28, 2014, 8 pages.
PCT/US2011/062204—International Search Report dated Nov. 1, 2012, 10 pages.
PCT/US2011/62207—International Search Report and Written Opinion dated Jun. 28, 2012, 7 pages.
PCT/US2014/013154—International Search Report dated May 23, 2014, 4 pages.
PCT/US2014/024548—International Search Report and Written Opinion dated Sep. 5, 2014, 11 pages.
PCT/US2013/064475—International Search Report and Written Opinion dated Jan. 16, 2014, 11 pages.
PCT/US2014/024254—International Search Report and Written Opinion dated Aug. 13, 2014, 10 pages.
PCT/US2014/026173—Notification of Transmittal of the International Search Report and the Written Opinion of the International Searching Authority, or the Declaration dated Jul. 9, 2014, 10 pages.
PCT/US2012/000470—International Search Report dated Mar. 8, 2013, 10 pages.
PCT/US2012/061151—International Search Report and Written Opinion dated Feb. 25, 2013, 9 pages.
PCT/US2012/061159—International Search Report dated Mar. 2, 2013, 10 pages.
PCT/US2014/024305—Notification of Transmittal of the International Search Report and the Written Opinion of the International Searching Authority, or the Declaration dated Aug. 26, 2014, 11 pages.
PCT/US2014/023990—Notification of Transmittal of the International Search Report and the Written Opinion of the International Searching Authority, or the Declaration dated Jul. 17, 2014, 10 pages.
PCT/US2015/57701—Notification of Transmittal of the International Search Report and the Written Opinion of the International Searching Authority, or the Declaration dated Dec. 22, 2015, 11 pages.
PCT/US2015/57756—Notification of Transmittal of the International Search Report and the Written Opinion of the International Searching Authority, or the Declaration dated Jul. 27, 2017, 41 pages.
PCT/US2014/020242—Notification of Transmittal of the International Search Report and the Written Opinion of the International Searching Authority, or the Declaration dated Aug. 5, 2014, 9 pages.
PCT/US2018/034289—Notification of Transmittal of the International Search Report and the Written Opinion of the International Searching Authority, or the Declaration dated Oct. 2, 2018, 22 pages.

"Steam Turbines", PDHengineer.com Course No. M-3006.
Steam Turbines (Energy Engineering) http://what-when-how.com/energy-engineering/steam-turbines-energy-engineering/, Oct. 25, 2012, 14 pages.
Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.
Pruess, Karsten, "Enhanced Geothermal Systems (EGS): Comparing Water and CO2 as Heat Transmission Fluids", Proceedings, New Zealand Geothermal Workshop 2007 Auckland, New Zealand, Nov. 19-21, 2007, 13 pages.
Pruess, Karsten, "Enhanced Geothermal Systems (EGS): Using CO2 as Working Fluid—A Novel Approach for Generating Renewable Energy with Simultaneous Sequestration of Carbon", Submitted to Geothermics, Jun. 2006, 26 pages.
Renz, Manfred, "The New Generation Kalina Cycle", Contribution to the Conference: "Electricity Generation from Enhanced Geothermal Systems", Sep. 14, 2006, Strasbourg, France, 18 pages.
Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.
San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.
Sarkar, J., and Bhattacharyya, Souvik, "Optimization of Recompression S-CO2 Power Cycle with Reheating" Energy Conversion and Management 50 (May 17, 2009), pp. 1939-1945.
Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.
Tom, Samsun Kwok Sun, "The Feasibility of Using Supercritical Carbon Dioxide as a Coolant for the Candu Reactor", The University of British Columbia, Jan. 1978, 156 pages.
"Two-flow rotors"; http://www.answers.com/topic/steam-turbine#ixzz2AJsKAwHX.
VGB PowerTech Service GmbH, "CO2 Capture and Storage", A VGB Report on the State of the Art, Aug. 25, 2004, 112 pages.
Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.
Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.
Wright, Steven A., et al., "Modeling and Experimental Results for Condensing Supercritical CO2 Power Cycles", Sandia Report, Jan. 2011, 47 pages.
Wright, Steven A., et al., "Supercritical CO2 Power Cycle Development Summary at Sandia National Laboratories", May 24-25, 2011, (1 page, Abstract only).
Wright, Steven, "Mighty Mite", Mechanical Engineering, Jan. 2012, pp. 41-43.
Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.
Yoon, Ho Joon, et al., "Preliminary Results of Optimal Pressure Ratio for Supercritical CO2 Brayton Cycle coupled with Small Modular Water Cooled Reactor", Paper, Korea Advanced Institute of Science and Technology and Khalifa University of Science, Technology and Research, May 24-25, 2011, Boulder, CO, 7 pages.

* cited by examiner

SYSTEMS AND METHODS FOR GENERATING ELECTRICITY VIA A PUMPED THERMAL ENERGY STORAGE SYSTEM

CROSS-REFERENCE TO RELATED APPLICATIONS

This application claims the benefit of U.S. Prov. Appl. No. 62/690,803, filed Jun. 27, 2018. This application is incorporated herein by reference in its entirety to the extent consistent with the present application.

BACKGROUND

Pumped thermal energy storage ("PTES") systems, also known as electro-thermal energy storage systems, are used to store and generate energy. PTES systems generally consist of a configurable thermodynamic cycle where thermal energy is transferred between a high temperature reservoir and a low temperature reservoir via working fluid in a working fluid circuit.

During a "charging" cycle of operation, the thermodynamic cycle, which is a heat pump cycle in a nominally forward direction, may be used to increase the thermal energy in the high temperature reservoir. In some instances, an electrical motor may be used to drive a compressor, which increases the pressure and temperature of the working fluid, whereby the thermal energy in the fluid is transferred to and stored in the high temperature reservoir by using a high temperature heat exchanger. Following the heat transfer to the high temperature reservoir, the fluid may be expanded through a turbine, which produces shaft work that may be used to drive the gas compressor. This working fluid expansion may lower the pressure and temperature of the working fluid. After exiting the turbine, the working fluid may pass through a low temperature heat exchanger that is connected to a low temperature reservoir and may affect transfer of heat from the low temperature reservoir to the working fluid. Upon exit from the low temperature heat exchanger, the working fluid may be returned to approximately its initial state (i.e., pressure and temperature).

During a "generating" cycle of operation, the directions of fluid and heat circulation are reversed. A pump may increase the pressure of the working fluid and move the working fluid through the high temperature heat exchanger, which transfers heat from the high temperature reservoir to the working fluid. The heated working fluid may be expanded by a turbine, producing shaft work. The shaft work from the turbine may exceed the compressor work, and the excess work may be converted to electrical power by a generator and distributed to an electrical grid electrically coupled to the generator. Following the turbine expansion, the working fluid may be cooled by passing through the low temperature heat exchanger that is connected to a low temperature reservoir before entering the pump. Upon exit of the low temperature heat exchanger, the working fluid may be returned to approximately its initial state (i.e., pressure and temperature).

One metric used to determine performance of a PTES system is round trip efficiency ("RTE"). Round trip efficiency is defined as the amount of electrical energy that may be produced during the generating cycle divided by the amount of electrical energy that was consumed during the charging cycle. Due to thermodynamic irreversibilities, pressure losses, and finite temperature approaches through the heat exchangers, the RTE values of PTES systems, as described above, are generally calculated at around 55-56%. Therefore, there is a need for an improved PTES system and method that results in a higher RTE, and greater electricity generation.

SUMMARY

A charging system in a PTES may include a fluid circuit configured to circulate a working fluid therethrough, the fluid circuit may include: a first heat exchanger through which the working fluid circulates in use; a second heat exchanger through which the working fluid circulates in use; a third heat exchanger through which the working fluid circulates in use; a compressor through which the working fluid circulates in use, wherein the working fluid enters the second heat exchanger at a first temperature and the working fluid exits the second heat exchanger at a second temperature, wherein the working fluid enters the third heat exchanger at the second temperature and the working fluid exits the third heat exchanger at a third temperature, wherein the working fluid enters the compressor at the third temperature and a first pressure, and the working fluid exits the compressor at a fourth temperature and a second pressure, and wherein the working fluid enter the first heat exchanger at the fourth temperature and the working fluid exits the first heat exchanger at a fifth temperature, the fifth temperature being lower than the fourth temperature; a turbine positioned between the first heat exchanger and the second heat exchanger, the turbine configured to expand the working fluid to the first temperature and the first pressure; a high temperature reservoir connected to the first heat exchanger and configured to transfer thermal energy to and from the working fluid; a low temperature reservoir connected to the second heat exchanger and configured to transfer thermal energy to and from the working fluid; and a waste heat reservoir connected to the third heat exchanger and configured to transfer thermal energy to and from the working fluid.

A generation system in a PTES system, may include: a fluid circuit for the circulation of a working fluid therethrough, the working fluid may include a first portion and a second portion comingled together, the fluid circuit may include: a pump to circulate the working fluid within the fluid circuit, wherein the working fluid enters the pump at a first pressure, and the working fluid exits the pump at a second pressure, a first heat exchanger through which the working fluid circulates in use; a second heat exchanger through which the working fluid circulates in use; a first turbine positioned between the first heat exchanger and the second heat exchanger and wherein the first turbine is for expanding the working fluid to a third pressure, the third pressure greater than the first pressure and less than the second pressure; a separation location where the working fluid is separated into the first portion and the second portion, a second turbine positioned between the first heat exchanger and the second heat exchanger and wherein the second turbine if for expanding the first portion of the working fluid to the first pressure; an auxiliary line through which the second portion of the working fluid circulates between the turbine and the first heat exchanger, a third heat exchanger through which the working fluid circulates in use positioned between an outlet of the turbine and an inlet of a heat rejection heat exchanger, and in fluid communication with the auxiliary line, wherein the third heat exchanger removes thermal energy from the second portion of the working fluid; the heat rejection heat exchanger positioned between an outlet of the third heat exchanger and an inlet of the first heat exchanger, and in fluid communication with the auxiliary line, wherein the heat rejection heat exchanger removes thermal energy from the second portion of the working fluid; a high temperature reservoir connected to the first heat exchanger for transferring thermal energy to and from the working fluid; a low temperature reservoir connected to the second heat exchanger for transferring thermal energy to and from the working fluid and a waste heat reservoir connected to the third heat exchanger for transferring thermal energy to and from the working fluid.

A method for charging a pumped thermal energy system, may include: circulating a working fluid through a fluid circuit, wherein the fluid circuit may include a first heat exchanger, a second heat exchanger, and a third heat exchanger connected thereto; circulating the working fluid through the second heat exchanger; providing thermal energy from the second heat exchanger to the working fluid; circulating the working fluid through a recuperator; circulating the working fluid through the third heat exchanger, wherein a waste heat reservoir storing waste heat transfers thermal energy to the working fluid to increase its temperature; circulating the working fluid through a compressor; and circulating the working fluid through the first heat exchanger to transfer thermal energy from the working fluid to a high temperature reservoir connected to the first heat exchanger.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
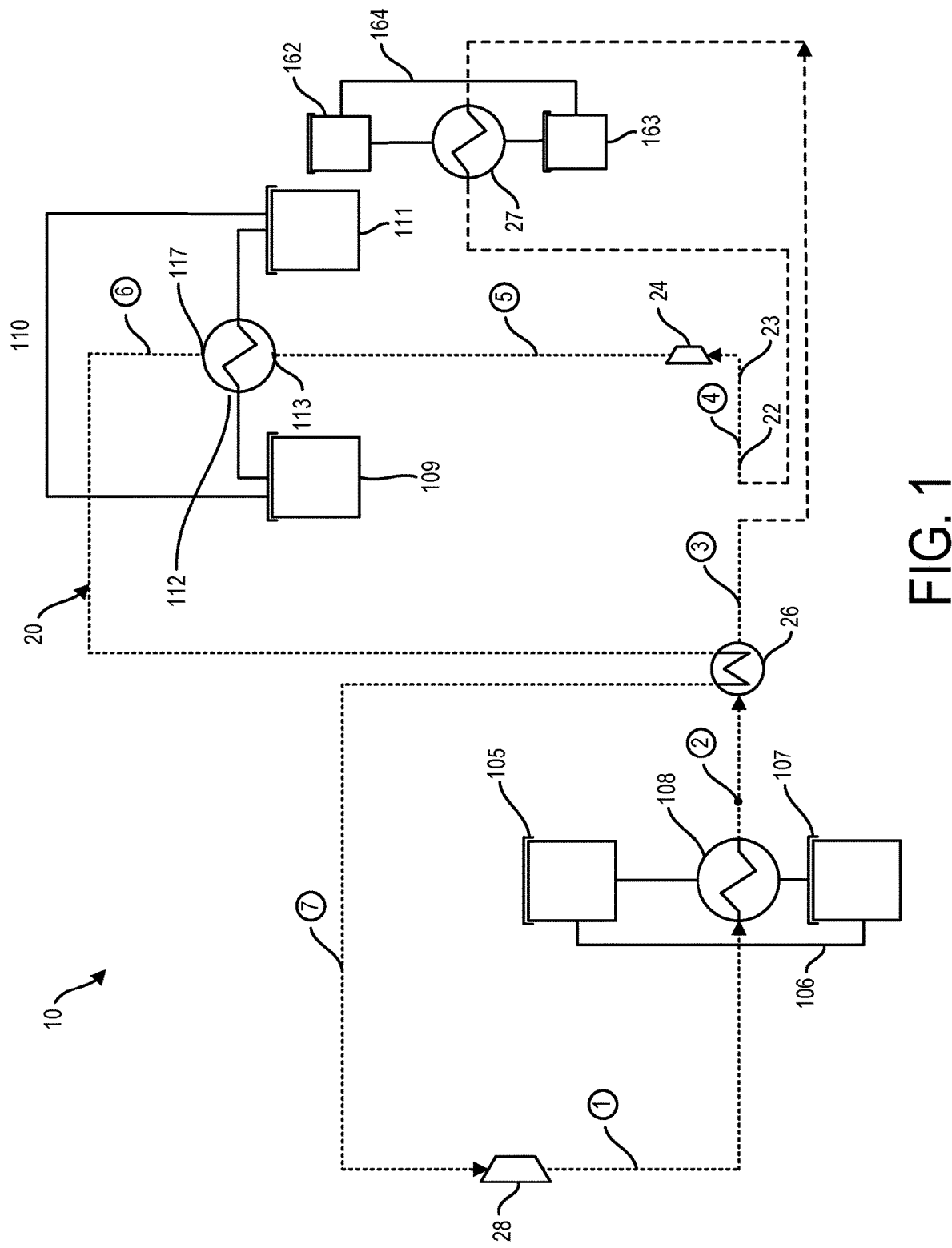
FIG. 1 is a schematic of a charging system of a pumped thermal energy storage ("PTES") system, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
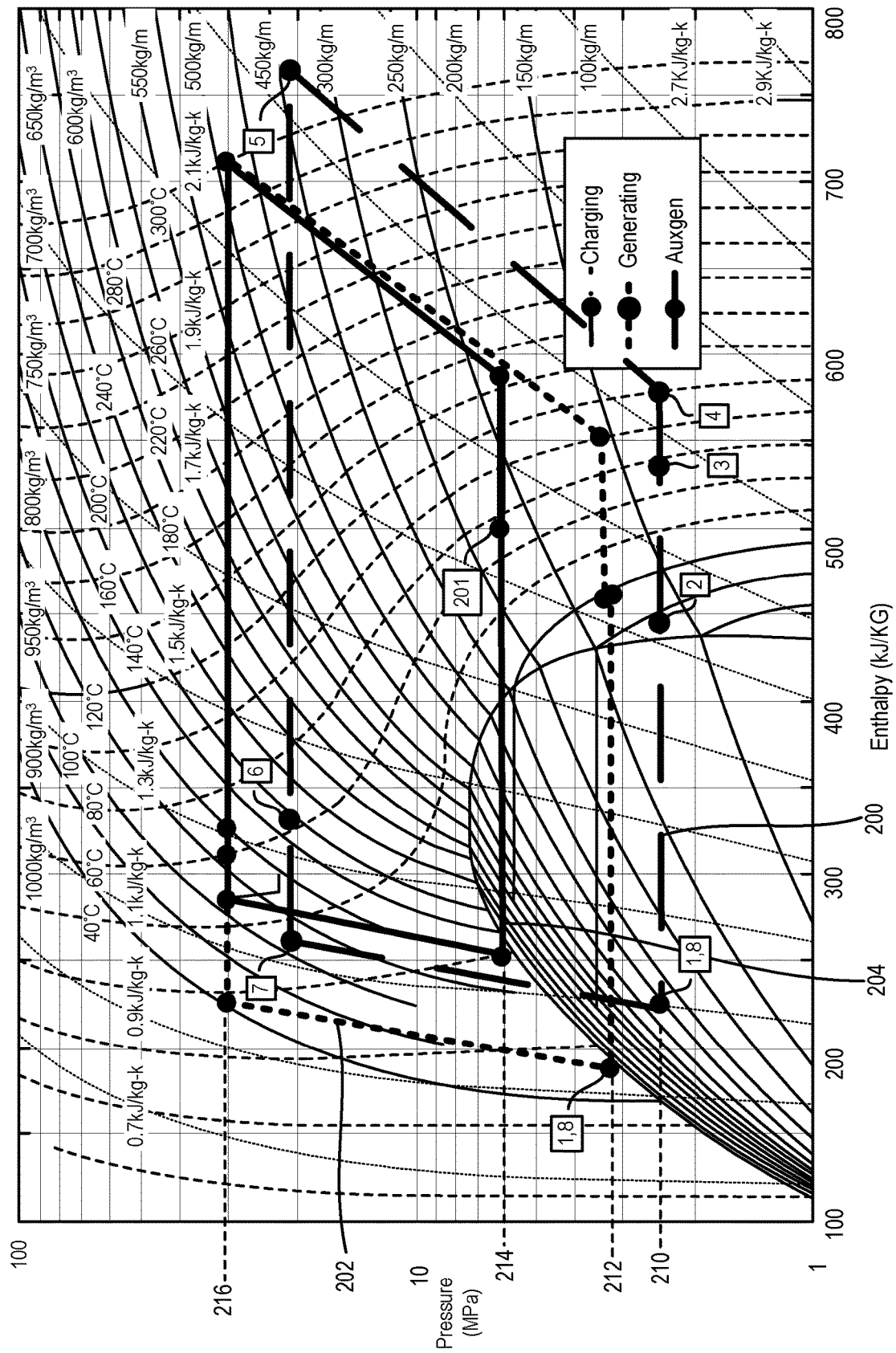
FIG. 2 is a pressure enthalpy diagram for the different cycles of operation of the PTES system of FIG. 1, according to one or more embodiments.

The following disclosure is directed to improved PTES systems that may result in an increased RTE in one or more embodiments. As will be discussed in more detail herein, during the charging cycle, the PTES system may include three heat exchangers, a first, second, and third heat exchanger. The three heat exchangers may introduce thermal energy to and receive thermal energy from a working fluid within a fluid circuit of the PTES system. A high temperature reservoir, a low temperature reservoir, and a waste heat reservoir may each be associated with a particular heat exchanger, may provide the thermal energy to the heat exchangers, and may receive the thermal energy from the heat exchangers. The waste heat reservoir may store heat from the generating cycle of the PTES system. The working fluid may be split into portions and moved through one or more heat exchangers to receive and provide thermal energy to and from the one or more heat exchangers and associated reservoirs. During the charging cycle, providing thermal energy from the waste heat reservoir to the working fluid, after the working fluid moves through the heat exchanger associated with the low temperature reservoir, may increase the RTE of the PTES system FIG. 1 is a schematic of a charging system 20 of a PTES system 10, according to one or more embodiments disclosed. FIG. 2 is a pressure enthalpy diagram for the different cycles of operation of the PTES system 10, according to one or more embodiments. The charging system 20 may circulate a first working fluid 22 in a first fluid circuit 23 during a charging cycle 200 of the PTES system 10. FIG. 1 depicts different states of the first working fluid 22 in the first fluid circuit 23 during the charging cycle 200, which are indicated with circled reference numbers. These reference numbers correlate to the circled reference numbers shown in FIG. 2.

Referring to FIG. 1 and FIG. 2, the PTES system 10 may include a high temperature reservoir 110, a low temperature reservoir 106, and a waste heat reservoir 164. The PTES system 10 may include a first heat exchanger 112, a second heat exchanger 108, and a third heat exchanger 27. The first heat exchanger 112 may be fluidly connected to the high temperature reservoir 110. The second heat exchanger 108 may be fluidly connected to the low temperature reservoir 106. The third heat exchanger 27 may be fluidly connected to the waste heat reservoir 164. The high temperature reservoir 110 may include a first material that has a higher temperature than a second material that is included in the low temperature reservoir 106. The waste heat reservoir 164 may include a third material that has a higher temperature than the first material in the low temperature reservoir 106.

The high temperature reservoir 110, which may contain the first material that may be utilized by the first heat exchanger 112, may transfer thermal energy to and from the first working fluid 22. The first material may be or include thermal oil, molten salt, water, particulate such as sand or gravel, concrete, encapsulated phase-change materials, bulk phase-change materials, a combination therein, or any other material suitable for use in the high temperature reservoir 110. The high temperature reservoir 110 may include a plurality of vessels, for example, a first high temperature vessel 109 and a second high temperature vessel 111 that may be in fluid communication with one another. However, the high temperature reservoir 110 may be a single vessel or three or more vessels in other embodiments. The first material may circulate between the first high temperature vessel 109 and the second high temperature vessel 111. The first material may be at a first high temperature in the first high temperature vessel 109 and at a second high temperature in the second high temperature vessel 111. The first high temperature may be higher than the second high temperature and vice-versa. The first material may circulate through the first heat exchanger 112 to transfer thermal energy to and from the first working fluid 22 of the PTES system 10. The first heat exchanger 112 may be a conventional heat exchanger, a printed circuit heat exchanger, a moving bed heat exchanger, a fluidized bed heat exchanger, or a packed bed thermocline.

The low temperature reservoir 106, which may include the second material that may be utilized by the second heat exchanger 108, may transfer thermal energy to and from the first working fluid 22. The second material may be or include water, glycol, ice, seawater, ethanol, low-temperature thermal oil, hydrocarbon fluid, a combination thereof, or any other material suitable for use in a low temperature reservoir 106. The low temperature reservoir 106 may include a plurality of vessels, for example, a first low temperature vessel 105 and a second low temperature vessel 107 that may be in fluid communication with one another. However, the low temperature reservoir 106 may be a single vessel or three or more vessels in other embodiments. The second material may circulate between the first low temperature vessel 105 and the second low temperature vessel 107. The second material may be at a first low temperature in the first low temperature vessel 105 and at a second low temperature in the second low temperature vessel 107. The first low temperature may be higher than the second low temperature and vice-versa. The second material may circulate through the second heat exchanger 108 to transfer thermal energy to and from the first working fluid 22 of the PTES system 10.

Similarly, the waste heat reservoir 164, which may include the third material that may be utilized by the third heat exchanger 27, may transfer thermal energy to and from the first working fluid 22. The third material may be or include thermal oil, molten salt, water, particulate such as sand or gravel, concrete, encapsulated phase-change materials, bulk phase-change materials, a combination therein, or any other material suitable for use in the waste heat reservoir 164. The waste heat reservoir 164 may include a plurality of vessels, for example, a first waste heat vessel 162 and a second waste heat vessel 163 that may be in fluid communication with one another. However, the waste heat reservoir 164 may be a single vessel or three or more vessels in other embodiments. The third material may circulate between the first waste heat vessel 162 and the second waste heat vessel 163. The third material may be at a first waste heat temperature in the first waste heat vessel 162 and at a second waste heat temperature in the second waste heat vessel 163. The first waste heat temperature may be higher than the second waste heat temperature and vice-versa. The third material may circulate through the third heat exchanger 27 to transfer thermal energy to and from the first working fluid 22 of the PTES system 10. The third heat exchanger 27 may be a conventional heat exchanger, a printed circuit heat exchanger, a moving bed heat exchanger, a fluidized bed heat exchanger, or a packed bed thermocline.

Referring to FIG. 1 and FIG. 2, during the charging cycle 200 of operation, as depicted with the dashed lines in FIG. 1, the PTES system 10 may use the charging system 20 to transfer thermal energy to the high temperature reservoir 110 by utilizing a reversible heat pump cycle. The charging system 20 may include a compressor 24 and a turbine 28 fluidly connected to the first heat exchanger 112 and the second heat exchanger 108. The compressor 24 may be a compressor driven by an electrical motor (not separately shown). The compressor 24 and/or the turbine 28 may circulate the first working fluid 22 through the charging system 20. One or more pumps, compressors, or turbines, not shown, may be incorporated to circulate the first working fluid 22 through the charging system 20.

The turbine 28 and the compressor 24 may be in fluid communication with the first fluid circuit 23 and may be positioned in the first fluid circuit 23 between the first heat exchanger 112 and the second heat exchanger 108. Prior to entering the second heat exchanger 108, the first working fluid 22 may be at a first state 1, wherein the temperature and pressure of the first working fluid 22 may be low. The first fluid circuit 23 at the first state 1 may be at a first pressure 210 of the first fluid circuit 23 at an inlet of the second heat exchanger 108, and the first pressure 210 may be the lowest pressure of the first fluid circuit 23 over the course of one cycle through the first fluid circuit 23. In embodiments, the first pressure 210 may be about equal to from about 1.5 MPa to about 4.5 MPa.

In the second heat exchanger 108, thermal energy may pass from the second material of the low temperature reservoir 106 to the first working fluid 22. The first working fluid 22 may therefore exit the second heat exchanger 108 at a higher temperature and may flow into a recuperator 26 where additional thermal energy may be transferred to and from the first working fluid 22. After the first working fluid 22 is discharged from the second heat exchanger 108, the temperature of the first working fluid 22 may be increased to a second state 2. The temperature of the first working fluid 22 after passing through the recuperator 26 may result in a third state 3. The first working fluid 22 may enter the third heat exchanger 27 to further increase the temperature of the first working fluid 22.

The third heat exchanger 27 may receive thermal energy from any heat source. For example, thermal energy may be transferred from the third material of the waste heat reservoir 164 through the third heat exchanger 27 and to the first working fluid 22 to further increase the temperature of the first working fluid 22. In other embodiments, thermal energy from a separate industrial process, not shown, may be transferred continuously or on an as needed basis from the separate industrial process to the third heat exchanger 27 for further transfer to the first working fluid 22. The separate industrial process can be any process that generates heat. For example, the separate industrial process can be a power generation process producing waste heat, for example steam; a chemical process such as petrochemical cracking processes or other chemical synthesis processes producing waste heat; or any process producing waste heat.

After exiting the third heat exchanger 27, the first working fluid 22 may be in a fourth state 4. The first working fluid 22 may enter the compressor 24 to increase the temperature and pressure of the first working fluid 22 to a fifth state 5. After exiting the compressor 24, the first working fluid 22 may be at a temperature of between about 300 C and about 360 C and at a pressure of between about 15 MPa and about 25 MPa. With the energy in the first working fluid 22 at the fifth state 5, the first working fluid 22 may be used to increase the thermal energy or charge the high temperature reservoir 110 by passing the first working fluid 22 the first heat exchanger 112. As the first working fluid 22 passes through the first heat exchanger 112, the energy within the first working fluid 22 decreases to a sixth state 6.

In the first heat exchanger 112, thermal energy may pass from the first working fluid 22 into the first material of the high temperature reservoir 110 where the thermal energy may be stored. The first working fluid 22 may therefore exit the first heat exchanger 112 at a lower temperature and may flow into a recuperator 26 where additional thermal energy may be transferred to and from the first working fluid 22. The recuperator 26 may be positioned between the second heat exchanger 108 and the compressor 24, and in fluid communication therein. The turbine 28 may be positioned between the recuperator 26 and the second heat exchanger 108.

After circulating through the recuperator 26 and emerging in the state 7, the first working fluid 22 may be expanded in the turbine 28 to return the first working fluid 22 to the first state 1. The pressure of the first working fluid 22 upon exit from the turbine 28 may be substantially the same as the pressure at the inlet of the compressor 24. In embodiments, a positive displacement expander, an expansion valve, or a fluid orifice may be used in conjunction or in place of the turbine 28 to expand the first working fluid 22. During the charging cycle 200 of operation, the PTES system 10 may expend electrical energy to charge or provide thermal energy to the high temperature reservoir 110 via a substantially reversible pump cycle.

The waste heat reservoir 164 may store thermal energy. The thermal energy may be introduced to the third material of the waste heat reservoir 164 from any heat source. As described below, the thermal energy may be introduced to the third material of the waste heat reservoir 164 from waste heat created in the generating cycle of the PTES system 10.

Figure 3:
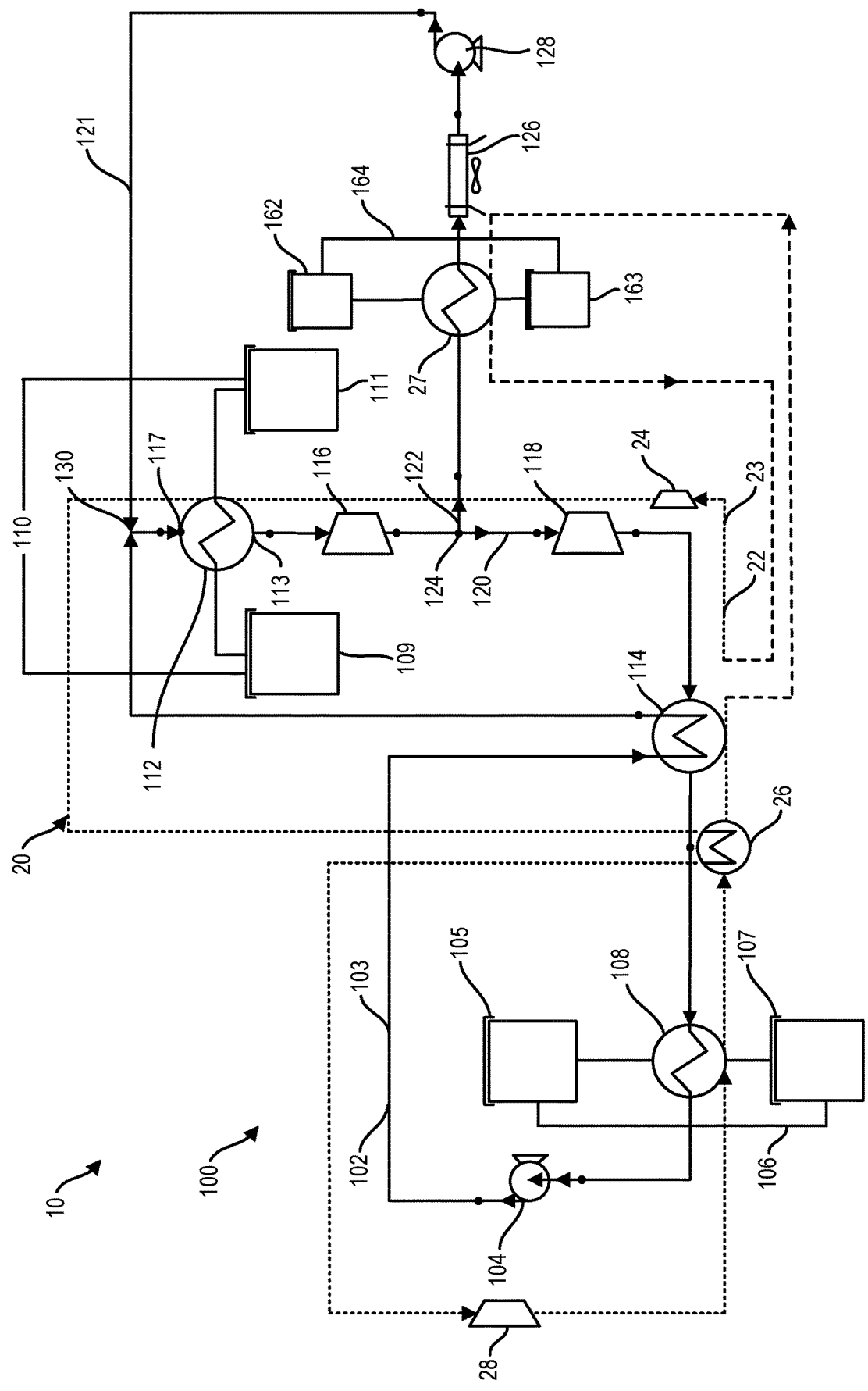
FIG. 3 is a schematic of the charging system shown in FIG. 1 and a generating system of the PTES system, according to one or more embodiments disclosed.

FIG. 3 is a schematic of the charging system 20 shown in FIG. 1 and a generating system 100 of the PTES system 10, according to one or more embodiments disclosed. The PTES system 10 may use a thermodynamic cycle to generate electrical power. The PTES system 10 may include the charging system 20 and the generating system 100. The generating system 100 may circulate the second working fluid 102 in a second fluid circuit 103 during a generating cycle 202 of the PTES system 10, and the charging system 20 may circulate the first working fluid 22 in the first fluid circuit 23 during a charging cycle 200 of the PTES system 10. Each of these cycles 200 and 202 are reflected in the pressure-enthalpy diagram of FIG. 2 as discussed herein. It should be understood that the first fluid circuit 23 and the second fluid circuit 103 may be combined into and operate as a single fluid circuit, not shown.

Returning to FIG. 3, the first working fluid 22 and the second working fluid 102 may be the same fluid or may be different fluids. The first and second working fluids 22 and 102 may flow through the first fluid circuit 23 and/or the second fluid circuit 103. The first working fluid 22 and the second working fluid 102 of the charging system 20 and the generating system 100, respectively, may be or include carbon dioxide ($CO_2$), ammonia, water, propane, butane, pentane, r245fa, or other fluids suitable for use in the generating system 100 and/or the charging system 20. The first fluid circuit 23 and the second fluid circuit 103 may be closed. The PTES system 10 may use either the charging system 20 or the generating system 100 at a given time. The PTES system 10 may use the charging system 20 and the generating system 100 at the same time.

The high temperature reservoir 110, which may include the first material that is utilized by the first heat exchanger 112, may transfer thermal energy to and from the second working fluid 102 of the PTES system 10. Similarly, the low temperature reservoir 106, which may include the second material that is utilized by the second heat exchanger 108, may transfer thermal energy to and from the second working fluid 102 in the PTES system 10. The waste heat reservoir 164, which may include the third material that may be utilized by the third heat exchanger 27, may transfer thermal energy to and from the second working fluid 102 of the PTES system 10.

In the generating cycle 202 of operation, the PTES system 10 may transfer thermal energy transfer from the first heat exchanger 112 to generate electricity from the PTES system 10. The generating system 100 of the PTES system 10 may include a first pump 104 to circulate the second working fluid 102 through the second fluid circuit 103 of the PTES system 10. The first pump 104 may use electrical energy to perform work. The first pump 104 may be fluidly connected to the first heat exchanger 112, the second heat exchanger 108, and the third heat exchanger 27. The first pump 104 may facilitate the transfer of thermal energy between the high temperature reservoir 110 and the second working fluid 102 via the first heat exchanger 112, the first pump 104 may facilitate the transfer of thermal energy between the low temperature reservoir 106 and the second working fluid 102 via the second heat exchanger 108, and may facilitate the transfer of thermal energy between the waste heat reservoir 164 and the second working fluid 102 via the third heat exchanger 27.

As depicted, with reference to FIG. 2, and FIG. 3, the PTES system 10 may include a recuperator 114 positioned in the second fluid circuit 103 between and in fluid communication with the first pump 104 and the first heat exchanger 112. The recuperator 26 and the recuperator 114 may be separate recuperators as depicted or may be the same recuperator. The recuperator 114 may be in fluid communication with the first pump 104 and the first heat exchanger 112. Prior to discharge from the first pump 104, the second working fluid 102 may be at a temperature and pressure that may be low. The second fluid circuit 103 may be at a first pressure 212 of the second fluid circuit 103 at an inlet of the first pump 104, and the first pressure 212 may be the lowest pressure of the second fluid circuit 103 over the course of one cycle through the second fluid circuit 103. In embodiments, the first pressure 212 may be equal to from about 1.5 MPa to about 4.5 MPa.

After the second working fluid 102 is discharged from the first pump 104, the pressure and temperature of the second working fluid 102 may be increased. The second fluid circuit 103 have a second pressure 216 at an outlet of the first pump 104. The second pressure 216 may be the highest pressure of the second working fluid 102 over the course of one cycle through the second fluid circuit 103. In embodiments, the second pressure 216 may be about equal to from about 25 MPa to about 35 MPa. The temperature of the second working fluid 102 may be further increased as the second working fluid 102 circulates through the recuperator 114. The second working fluid 102 may enter an inlet 117 of the first heat exchanger 112 and thermal energy may be passed from the high temperature reservoir 110 to the second working fluid 102 to increase the temperature of the second working fluid 102. During one cycle of the generation cycle 200, the PTES system 10 may exhibit the greatest amount of enthalpy after exiting an outlet 113 of the first heat exchanger 112.

The generating system 100 may further include a first turbine 116 and a second turbine 118 that may each be fluidly connected to the second fluid circuit 103 and positioned between the first heat exchanger 112 and the recuperator 114. While FIG. 3 depicts the first turbine 116 and the second turbine 118 as separate components, the first turbine 116 and the second turbine 118 may be combined or replaced by a single multi-stage turbine, not shown.

In embodiments, the first turbine 116 may be positioned between the first heat exchanger 112 and the second turbine 118. After the second working fluid 102 exits the first heat exchanger 112, the second working fluid 102 may be expanded in the first turbine 116, producing shaft work. The expansion of the second working fluid 102 may decrease the pressure of the working fluid to a third pressure 214. The third pressure 214 may be greater than the first pressure 212 and less than the second pressure 216. The third pressure 214 may be about equal to from about 6 MPa to about 7 MPa. After exiting the first turbine 116 and before entering the second turbine 118, the second working fluid 102 may be separated into a first portion 120 and a second portion 122 at a separation point 124 in the second fluid circuit 103. For clarity, it should be noted that the second working fluid 102 may include commingled portions of the first portion 120 and the second portion 122 as the generating cycle repeats.

The first portion 120 may continue to the second turbine 118 where the first portion 120 may be further expanded, producing additional shaft work. The second expansion of the first portion 120 may further decrease the pressure of the second working fluid 102. The first portion may be at the first pressure 212 and returned to substantially the same pressure as that of the eighth state 8. The low pressure in the eighth state 8 may be about equal to from about 1.5 MPa to about 4.5 MPa. The combined turbine work from the first turbine 116 and the second turbine 118 may exceed the pump work from the generating cycle 202 of operation, and the excess energy may be converted to electrical power by a generator (not shown) and fed into an electrical grid (not shown).

Following the exit from the second turbine 118, the first portion 120 of the second working fluid 102 may circulate through the recuperator 114 thereby transferring some of its thermal energy to the second working fluid 102 passing through the recuperator 114. The second heat exchanger 108 may be in fluid communication with and positioned in the second fluid circuit 103 between the recuperator 114 and the first pump 104. Thermal energy may be transferred from the first portion 120 to the low temperature reservoir 106, which may return the first portion 120 of the second working fluid 102 to substantially the eighth state 8 (both in temperature and pressure) before once again entering the first pump 104. It should be noted that the eighth state 8 may have the same temperature and pressure as the first state 1 and the changes in enthalpy and pressure for the generating system 100 may operate approximately within the enthalpy and pressure ranges of the charging system 20.

At a separation point 124 of the second working fluid 102, the second portion 122 of the second working fluid 102 may flow into an auxiliary line 121. The separation point 124 may be positioned between the first turbine 116 and the second turbine 118. The auxiliary line 121 may be positioned between the first turbine 116 and the inlet 117 of the first heat exchanger 112 and may be part of the second fluid circuit 103. The flow of the second portion 122 of the second working fluid 102 through the auxiliary line 121 may define an auxiliary flow path 204 of the PTES system. The auxiliary line 121 and the auxiliary flow path 204 may terminate at a combination point 130 that is positioned before an inlet 117 of the first heat exchanger 112. At the combination point 130, the second portion 122 may be combined with the first working fluid 102 such that the first portion 120 and the second portion 122 may be comingled.

In the multi-stage turbine, the first and second portions of the second working fluid 102 may be separated from the second working fluid 102 through the multi-stage turbine after a first expansion stage and prior to a subsequent expansion stage. The second working fluid 102 may enter an inlet of the multi-stage turbine at the second pressure 216 and the second working fluid 102 may be split into the first portion 120 and the second portion 122 within the multi-stage turbine. The first portion 120 of the second working fluid 102 may be expanded and exit a first outlet of the multi-stage turbine at the first pressure 212 and the second portion 122 of the second working fluid 102 may be expanded and exit a second outlet of the multi-stage turbine at the third pressure 214. Upon exit of the multi-stage turbine, the second portion 122 may flow into the auxiliary line 121 as described herein, and the first portion 120 may flow into the second heat exchanger 108.

The auxiliary line 121 may include the third heat exchanger 27, a heat rejection heat exchanger 126, and a second pump 128 that may be fluidly connected to the second fluid circuit 103 between the first turbine 116 and the first heat exchanger 112. The heat rejection heat exchanger 126 and the second pump 128 may be connected in series.

The second portion 122 of the second working fluid 102 may circulate through the third heat exchanger 27. The second portion 122 may transfer thermal energy to the third material of the waste heat reservoir 164 and may bring the second portion 122 to state 201. The thermal energy from the second portion 122 may be stored in the waste heat reservoir 164 for later use, for example, during the charging cycle 200. The second portion 122 may flow into the heat rejection heat exchanger 126. The second portion 122 may be cooled to near an ambient temperature in the heat rejection heat exchanger 126. The heat rejection heat exchanger 126 may reject the heat to the environment. 'Near an ambient temperature' may include a fluid temperature in the range of about zero to about 10 degrees Celsius (10 C), about zero to about 20 C, about zero to about 30 C, or a lower or higher temperature differential, of the temperature of the surrounding environment.

The heat transferred to the waste heat reservoir 164 and rejected by the heat rejection heat exchanger 126 may eliminate excess heat in the PTES system 10 that was created due to irreversible thermodynamic process during the charging cycle 200 and the generating cycle 202. The combination of the third pressure 214 and lower temperature may result in a high-density fluid state at an outlet of the heat rejection heat exchanger 126. Because the heat rejection process of the heat rejection heat exchanger 126 may be decoupled from the recuperator 114 via the auxiliary generating cycle 204, a greater amount of residual enthalpy may be recovered by the PTES system 10. After the second portion 122 exits the heat rejection heat exchanger 126, the second portion 122 may enter the second pump 128 where the pressure of the second portion 122 of the working fluid may be increased to the second pressure 216. Because the second portion 122 is in a high-density fluid state, the work required to raise the pressure of the second portion 122 may be significantly reduced. After the second portion 122 of the working fluid exits the second pump 128, the second portion is at a state that may be close to that of state of the second working fluid 102 after is leaves the recuperator 114. Therefore, the second portion 122 may be combined with the second working fluid 102 at the combination point 130.

Figure 4:
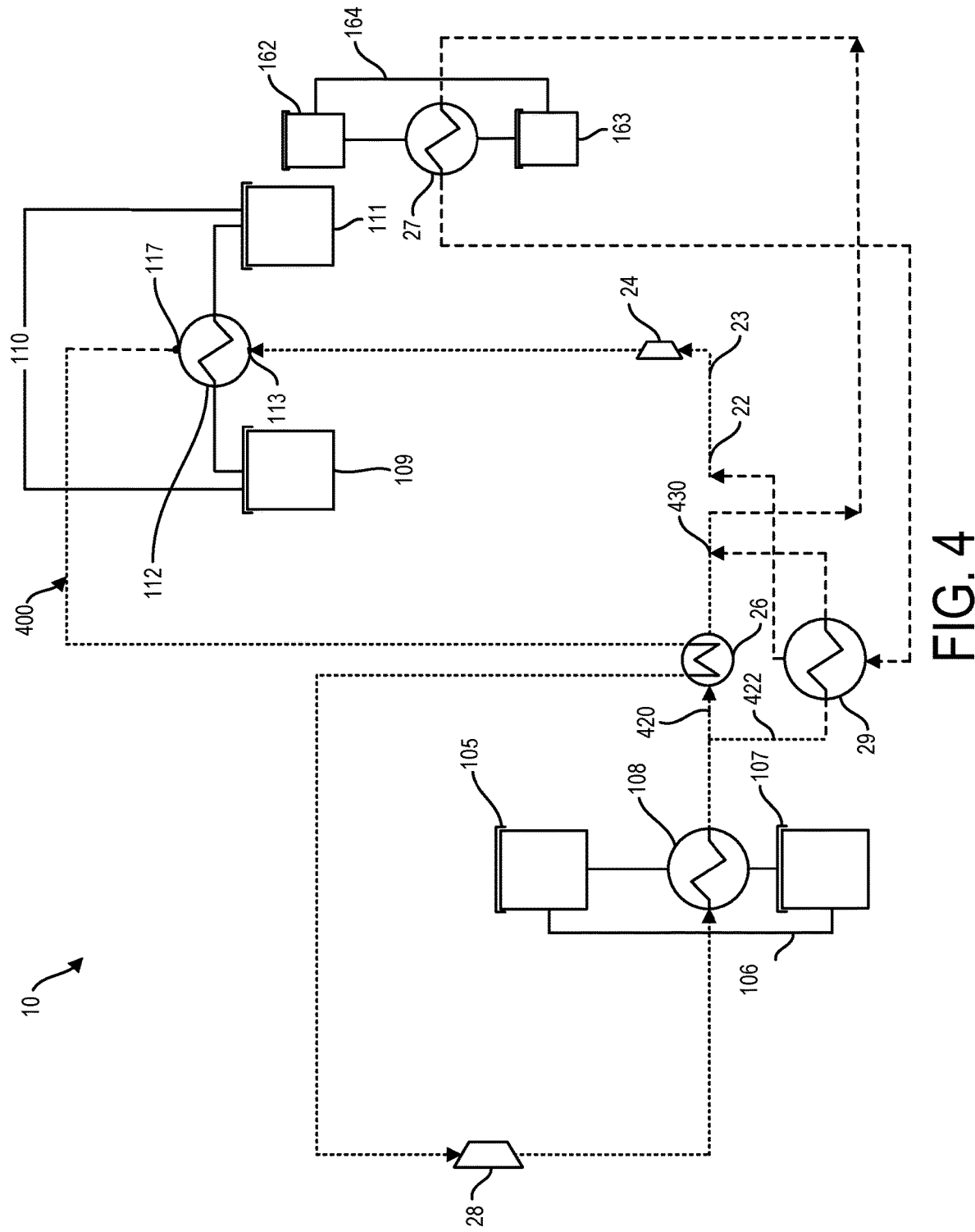
FIG. 4 is a schematic of an alternative example charging system of the PTES system shown in FIG. 3, according to one or more embodiments disclosed.
Figure 5:
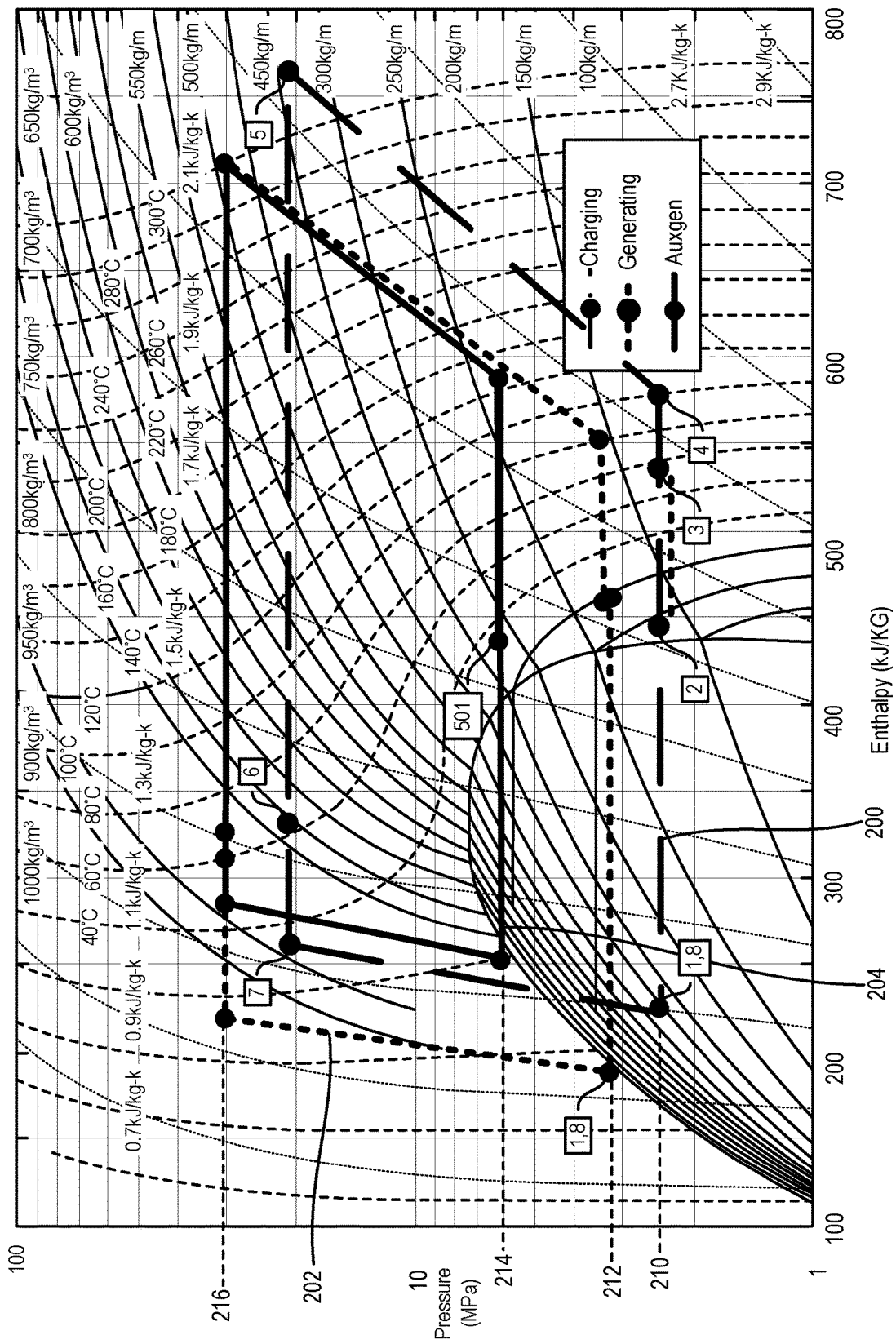
FIG. 5 is a pressure enthalpy diagram for the alternative example charging system of FIG. 4 operating with the PTES system of FIG. 3, according to one or more embodiments disclosed.

FIG. 4 is a schematic of an alternative example charging system 400 of the PTES system 10 shown in FIG. 3, according to one or more embodiments disclosed. FIG. 5 is a pressure enthalpy diagram for the alternative example charging system 400 of FIG. 4 operating with the PTES system 10 of FIG. 3. Referring to FIG. 4 and FIG. 5, the waste heat reservoir 164 may store thermal energy from the PTES system 10 introduced during a given generating cycle described herein. As depicted in FIG. 5, the thermal energy may have been stored in the waste heat reservoir 164 during the portion of the generating cycle that lowered the second portion 122 temperature, with reference to FIG. 3, to the state depicted on FIG. 5 as temperature and pressure 501. The charging system 400 may include a fourth heat exchanger 29 fluidly connected to the first fluid circuit 23. The first working fluid 22 may be split into a first portion 420 and a second portion 422 after discharge from the second heat exchanger 108 and before entering the recuperator 26. Thermal energy from the waste heat reservoir 164 may be transferred to the second portion 422 to increase the temperature of the second portion 422 of the first working fluid 22. The recuperator 26 may increase the temperature of the second portion 420. Overall energy savings may be realized by utilizing some of the thermal energy from the waste heat reservoir 164 through the heat exchanger 29 to raise the temperature of the second portion 422. The first portion 420 and the second portion 422 may be combined at a combination point 430 and may be in the third state 3 of the charging cycle 200. The first working fluid 22 may move through the third heat exchanger 27 to gain additional thermal energy from the waste heat reservoir 164 prior to entering the compressor 24. After exiting the waste heat reservoir 164, the first working fluid 22 may be in the fourth state 4 of the charging cycle 200. The charging system 400 may otherwise function in a substantially similar manner to the charging system 20 in FIG. 1.

Figure 6:
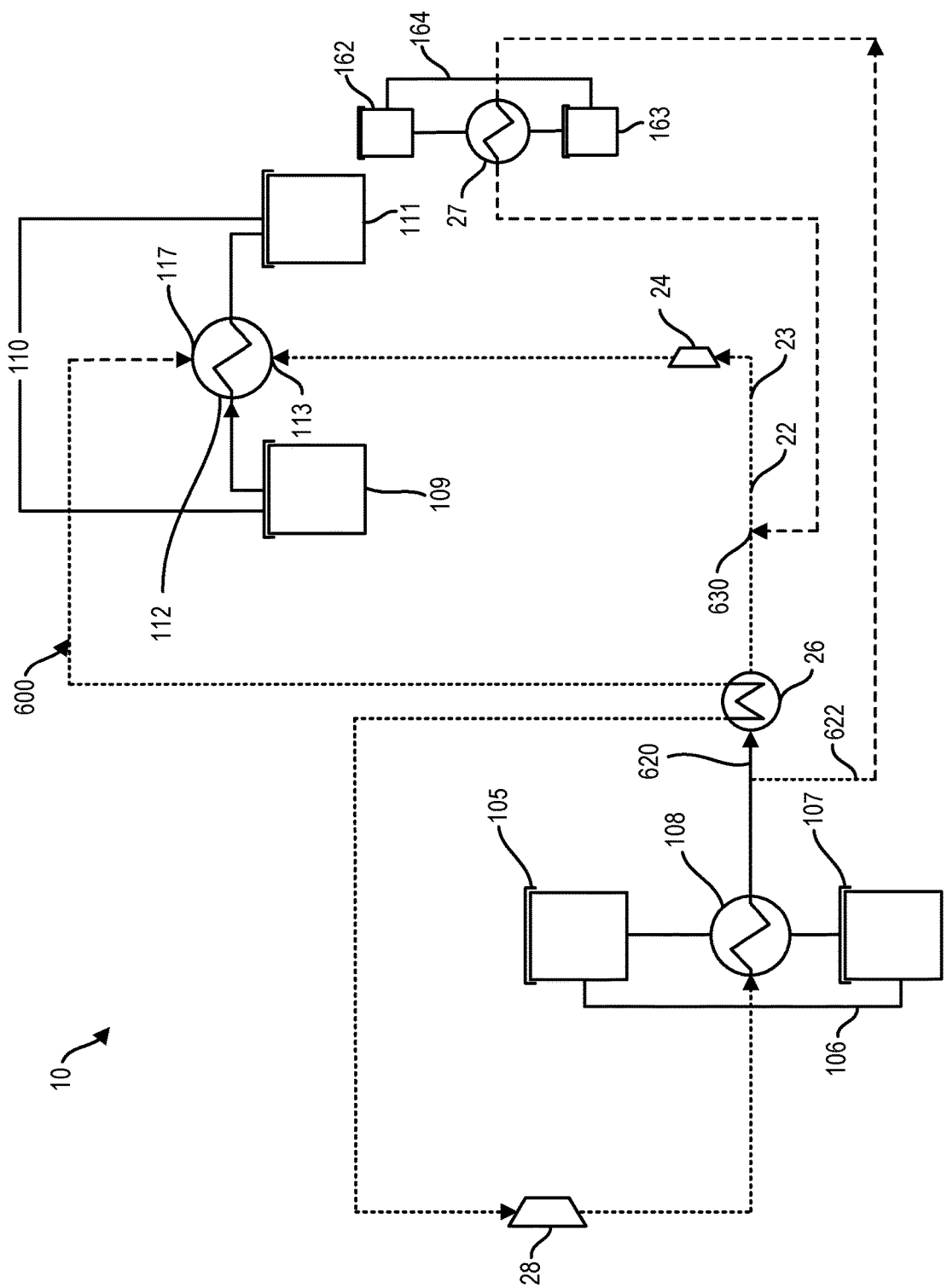
FIG. 6 is a schematic of another alternate example charging system of the PTES system shown in FIG. 3, according to one or more embodiments disclosed.
Figure 7:
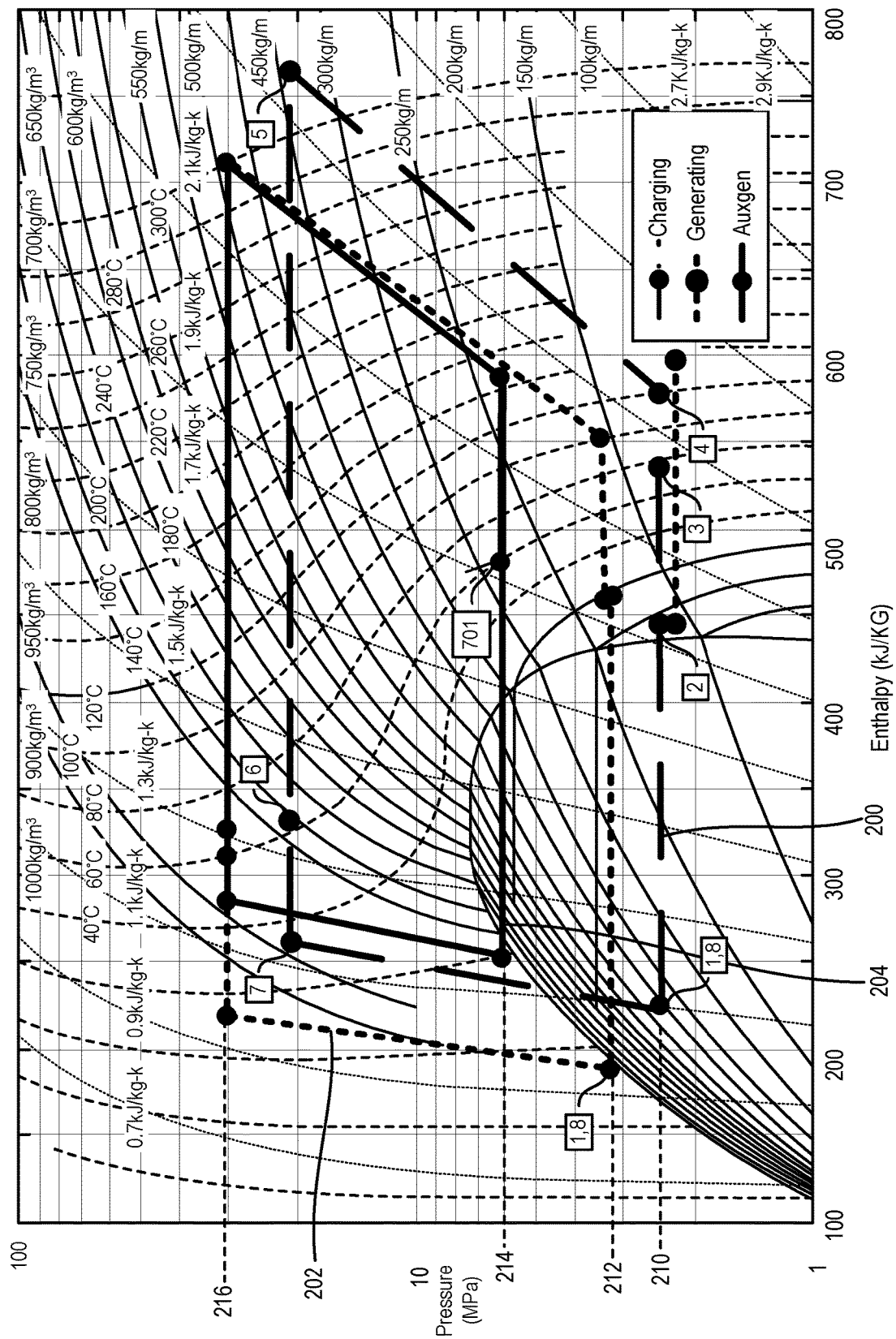
FIG. 7 is a pressure enthalpy diagram for the alternative example charging system of FIG. 6 operating with the PTES system of FIG. 3, according to one or more embodiments disclosed.

FIG. 6 is a schematic of another alternate example charging system 600 of the PTES system 10 shown in FIG. 3, according to one or more embodiments disclosed. FIG. 7 is a pressure enthalpy diagram for the alternative example charging system 600 of FIG. 6 operating with the PTES system 10 of FIG. 3, according to one or more embodiments disclosed. Referring to FIG. 6 and FIG. 7, the waste heat reservoir 164 may store thermal energy from the PTES system 10 introduced during a given charging cycle described herein. As depicted in FIG. 6, the thermal energy may have been stored in the waste heat reservoir 164 during the portion of the generation cycle that lowered the second portion 122 temperature, with reference to FIG. 3, to the state depicted in FIG. 7 as temperature and pressure 701. The first working fluid 22 may be split into a first portion 620 and a second portion 622 after discharge from the second heat exchanger 108 and before entering the recuperator 26. Thermal energy from the waste heat reservoir 164 may be transferred to the second portion 622 to increase the temperature of the second portion 622 of the first working fluid 22. The recuperator 26 may increase the temperature of the first portion 620. Overall energy savings may be realized by utilizing thermal energy from the waste heat reservoir 164 through the heat exchanger 27 to raise the temperature of the second portion 622. The first portion 620 and the second portion 622 may be combined at a combination point 630 and may be in the fourth state 4 of the charging cycle 200. The charging system 600 may otherwise function in a substantially similar manner to the charging system 20 in FIG. 1.

As discussed earlier, one metric of overall cycle performance of PTES systems is round-trip efficiency ("RTE"). The RTE may be defined as the amount of electrical energy that can be produced during one cycle of a generating cycle of a PTES system divided by the amount of electrical energy that was consumed during one cycle of a charging cycle of a PTES system. In each of the PTES systems described above, the RTE may be improved in comparison to traditional PTES systems and a greater amount of electricity from the PTES systems may be recovered. While traditional PTES systems usually have an estimated RTE of 55-56%, the PTES system 10 with charging system 20, 400, and 600 disclosed herein may result in an estimated RTE of about 56% to about 61% or about 56% to about 66% or higher.

Figure 8:
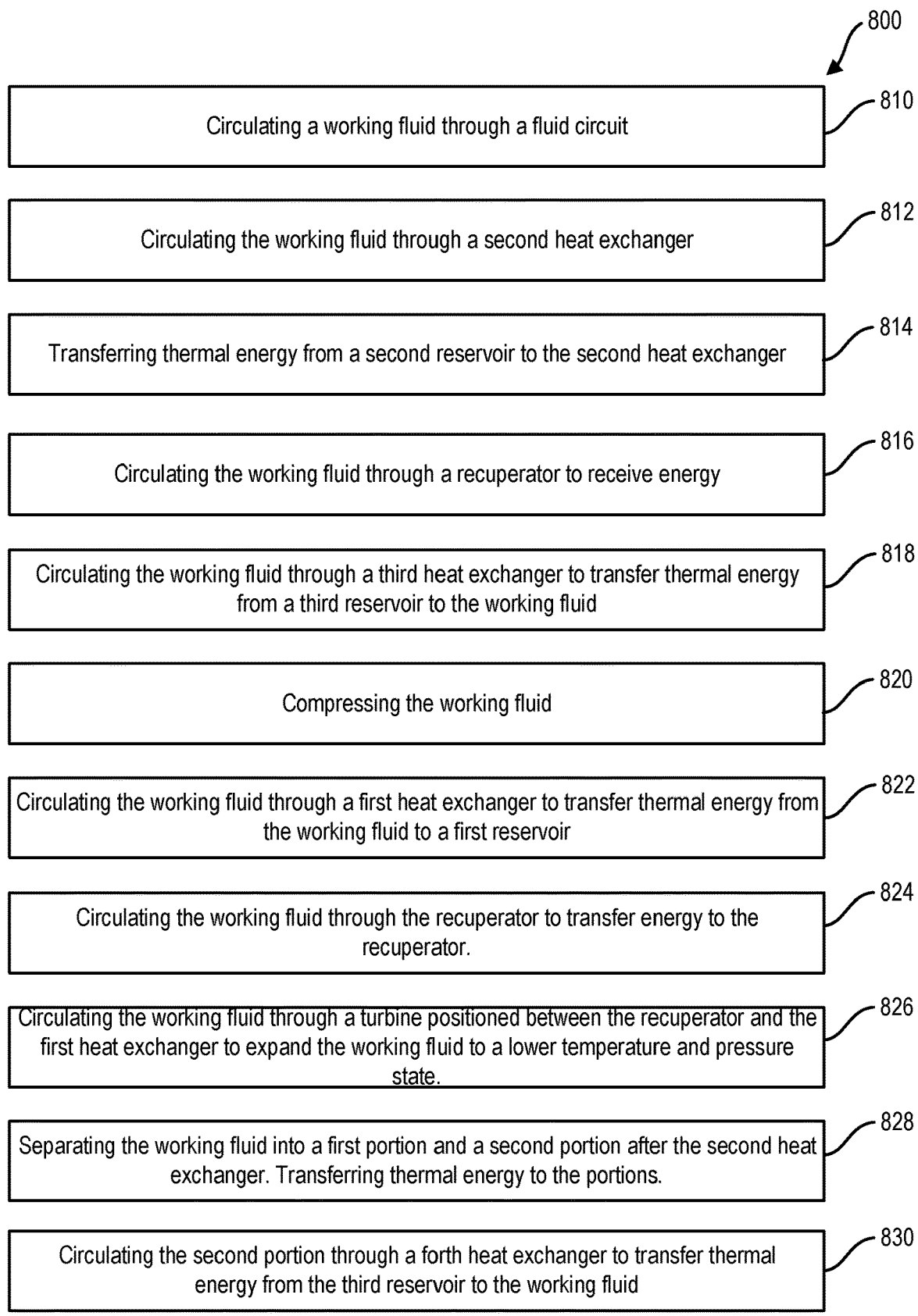
FIG. 8 is a flowchart depicting methods for charging the PTES system, according to one or more embodiments disclosed.

FIG. 8 is a flowchart depicting methods for charging the PTES system 10, according to one or more embodiments disclosed. A method 800 for charging a pumped thermal energy system is disclosed. In 810, the method 800 may include circulating a working fluid through a fluid circuit. The fluid circuit may include a first heat exchanger, a second heat exchanger, and a third heat exchanger connected thereto. A pump, turbine, and/or compressor may be used therewith to circulate the fluid therethrough.

In 812, the method 800 may include circulating the working fluid through the second heat exchanger. The working fluid may be circulated by the pump, turbine, and/or compressor. The pump may circulate the working fluid without changing its pressure. The pump, turbine, and/or compressor may circulate the working fluid and may change its pressure and/or temperature.

In 814, the method 800 may include transferring thermal energy from a second or low temperature reservoir to the second heat exchanger to facilitate thermal energy transfer with the working fluid. Accordingly, as the working fluid moves through the second heat exchanger, the thermal energy of the working fluid may be increased.

In 816, the method 800 may include circulating the working fluid through a recuperator to increase the thermal energy of the working fluid.

In 818, the method 800 may include circulating the working fluid through the third heat exchanger. The thermal energy from a third or waste heat reservoir may be transferred to the working fluid by the third heat exchanger. As the working fluid moves through the third heat exchanger, the thermal energy of the working fluid may be increased.

In 820, the method 800 may include compressing the working fluid through a compressor. As the working fluid moves through the compressor, the temperature and pressure of the working fluid may be increased.

In 822, the method 800 may include circulating the working fluid through the first heat exchanger to transfer thermal energy from the working fluid to a first or high temperature reservoir storing the thermal energy within the high temperature reservoir. As the working fluid moves through the first heat exchanger, the first reservoir may be heated, and the thermal energy may be stored within the first reservoir for later use during a generation cycle. Accordingly, the thermal energy of the working fluid may be decreased.

In 824, the method 800 may include circulating the working fluid through the recuperator to transfer energy to and from the working fluid. Circulating the working fluid through the recuperator, the thermal energy in the working fluid may be further reduced.

In 826, the method 800 may include expanding the working fluid via a turbine fluidly connected to the fluid circuit. The turbine may be positioned between the first heat exchanger and the second heat exchanger of the fluid circuit. Moving the working fluid through the turbine may expand the working fluid to a lower temperature and pressure.

In 828, the method 800 may include separating the working fluid into a first portion and a second portion after moving the working fluid through the second heat exchanger. Transferring thermal energy to the first portion by circulating the first portion through the recuperator. Transferring thermal energy to the second portion by circulating the second portion through the third heat exchanger. The first portion and the second portion may be recombined at a point between the recuperator and the compressor. The working fluid may be separated into the first portion and the second portion after the working fluid is moved through the recuperator.

In 830 the method 800 may include circulating the second portion through a fourth heat exchanger to transfer thermal energy from the third reservoir to the second portion. The first portion and the second portion may be recombined at a point between the recuperator and the third heat exchanger. The recombined portions may be circulated through the third heat exchanger and then moved through the compressor.

The present disclosure further relates to any one or more of the following numbered embodiments:

1. A charging system in a pumped thermal energy storage ("PTES") system, comprising: a fluid circuit for circulating a working fluid therethrough, the fluid circuit comprising: a first heat exchanger through which the working fluid circulates in use; a second heat exchange through which the working fluid circulates in use; a third heat exchanger through which the working fluid circulates in use; a compressor through which the working fluid circulates in use, wherein the working fluid enters the second heat exchanger at a first temperature and the working fluid exits the second heat exchanger at a second temperature, wherein the working fluid enters the third heat exchanger at the second temperature and the working fluid exits the third heat exchanger at a third temperature, wherein the working fluid enters the compressor at the third temperature and a first pressure, and the working fluid exits the compressor at a fourth temperature and a second pressure, and wherein the working fluid enter the first heat exchanger at the fourth temperature and the working fluid exits the first heat exchanger at a fifth temperature, the fifth temperature being lower than the fourth temperature; a turbine positioned between the first heat exchanger and the second heat exchanger, the turbine for expanding the working fluid to the first temperature and the first pressure; a high temperature reservoir connected to the first heat exchanger for transferring thermal energy to and from the working fluid; and a low temperature reservoir connected to the second heat exchanger for transferring thermal energy to and from the working fluid; and a heat source connected to the third heat exchanger for transferring thermal energy to and from the working fluid.

2. The charging system of embodiment 1, wherein the heat source comprises a waste heat from a PTES generating cycle stored in a waste heat reservoir.

3. The charging system of embodiments 1 or 2, wherein the heat source comprises thermal energy from a separate industrial process.

4. The charging system according to any embodiments 1 to 3, wherein the working fluid is split into a first portion and a second portion after exiting the second heat exchanger and prior to entering the compressor.

5. The charging system according to any embodiments 1 to 4, wherein the fluid circuit further comprises a recuperator positioned between the second heat exchanger and the third heat exchanger.

6. The charging system according to any embodiments 1 to 5, wherein the working fluid is split into a first portion and a second portion prior to entering the recuperator.

7. The charging system according to any embodiment 1 to 6, wherein the first portion is circulated through the recuperator, the second portion is circulated through the third heat exchanger and wherein the first and second portions are recombined at a location in the fluid circuit between the recuperator and the compressor.

8. The charging system according to any embodiments 1 to 7, wherein the fluid circuit further comprises a fourth heat exchanger wherein the first portion is circulated through the recuperator, the second portion is circulated through the fourth heat exchanger, and wherein the first and second portions are recombined at a location in the fluid circuit between the recuperator and the third heat exchanger.

9. The charging system according to any embodiments 1 to 8, wherein the fluid circuit further comprises a generating system in the PTES.

10. A generation system in a pumped thermal energy storage ("PTES") system, comprising: a fluid circuit for the circulation of a working fluid therethrough, the working fluid comprising a first portion and a second portion comingled together, the fluid circuit comprising: a pump to circulate the working fluid within the fluid circuit, wherein the working fluid enters the pump at a first pressure, and the working fluid exits the pump at a second pressure, a first heat exchanger through which the working fluid circulates in use;

a second heat exchanger through which the working fluid circulates in use; a first turbine positioned between the first heat exchanger and the second heat exchanger and wherein the first turbine is for expanding the working fluid to a third pressure, the third pressure greater than the first pressure and less than the second pressure; a separation location where the working fluid is separated into the first portion and the second portion, a second turbine positioned between the first heat exchanger and the second heat exchanger and wherein the second turbine if for expanding the first portion of the working fluid to the first pressure; an auxiliary line through which the second portion of the working fluid circulates between the turbine and the first heat exchanger, a third heat exchanger through which the working fluid circulates in use positioned between an outlet of the turbine and an inlet of a heat rejection heat exchanger, and in fluid communication with the auxiliary line, wherein the third heat exchanger removes thermal energy from the second portion of the working fluid; the heat rejection heat exchanger positioned between an outlet of the third heat exchanger and an inlet of the first heat exchanger, and in fluid communication with the auxiliary line, wherein the heat rejection heat exchanger removes thermal energy from the second portion of the working fluid; a high temperature reservoir connected to the first heat exchanger for transferring thermal energy to and from the working fluid; a low temperature reservoir connected to the second heat exchanger for transferring thermal energy to and from the working fluid; and a waste heat reservoir connected to the third heat exchanger for transferring thermal energy to and from the working fluid.

11. The generation system of embodiment 10, wherein the waste heat reservoir stores a waste heat from the PTES system 12. The generation system of embodiments 10 or 11, wherein the heat rejection heat exchanger decreases the temperature of the second portion of the working fluid to within zero to 10 C of an ambient temperature of a surrounding environment.

13. The generation system according to any embodiment 10 to 12, wherein the heat rejection heat exchanger releases the thermal energy of the second portion of the working fluid to the surrounding environment.

14. The generation system according to any embodiment 10 to 13, wherein the working fluid is split into the first portion and the second portion after exiting the first turbine.

15. The generation system according to any embodiments 10 to 14, wherein the auxiliary line includes a second pump positioned between the heat rejection heat exchanger and the first heat exchanger, the second pump for increasing the pressure of the second portion of the working fluid.

16. The generation system according to any embodiments 10 to 15, wherein the fluid circuit includes a recuperator positioned between the second turbine and the second heat exchanger.

17. The generation system according to any embodiments 10 to 16, wherein the third heat exchanger is in fluid communication with the heat rejection heat exchanger.

18. A method for charging a pumped thermal energy system, comprising: circulating a working fluid through a fluid circuit, wherein the fluid circuit comprises a first heat exchanger, a second heat exchanger, and a third heat exchanger connected thereto; circulating the working fluid through the second heat exchanger; providing thermal energy from the second heat exchanger to the working fluid; circulating the working fluid through a recuperator; circulating the working fluid through the third heat exchanger, wherein a waste heat reservoir storing waste heat transfers thermal energy to the working fluid to increase its temperature; circulating the working fluid through a compressor; and circulating the working fluid through the first heat exchanger to transfer thermal energy from the working fluid to a high temperature reservoir connected to the first heat exchanger.

19. The method of embodiment 18, further comprising circulating the working fluid through a recuperator that is positioned in the fluid circuit between the first heat exchanger and the second heat exchanger.

20. The method of embodiments 18 or 19, further comprising providing thermal energy from a low temperature reservoir to the second heat exchanger to facilitate thermal energy transfer with the working fluid.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A charging system in a pumped thermal energy storage ("PTES") system, comprising:
a fluid circuit for circulating a working fluid therethrough, the fluid circuit comprising:
a first heat exchanger through which the working fluid circulates in use;
a second heat exchanger through which the working fluid circulates in use;
a third heat exchanger through which the working fluid circulates in use;
a recuperator positioned between the second heat exchanger and the third heat exchanger through which the working fluid circulates in use; and
a compressor through which the working fluid circulates in use,
wherein:
the working fluid enters the second heat exchanger at a first temperature and the working fluid exits the second heat exchanger at a second temperature,
the working fluid enters the recuperator at the second temperature and the working fluid exits the recuperator at a third temperature,
the working fluid enters the third heat exchanger at the third temperature and the working fluid exits the third heat exchanger at a fourth temperature,
the working fluid enters the compressor at the fourth temperature and a first pressure, and the working fluid exits the compressor at a fifth temperature and a second pressure, and
the working fluid enters the first heat exchanger at the fifth temperature and the working fluid exits the first heat exchanger at a sixth temperature, the sixth temperature being lower than the fifth temperature;
a turbine positioned between the first heat exchanger and the second heat exchanger, the turbine for expanding the working fluid to the first temperature and the first pressure;

a high temperature reservoir connected to the first heat exchanger for transferring thermal energy to and from the working fluid;

a low temperature reservoir connected to the second heat exchanger for transferring thermal energy to and from the working fluid; and a heat source connected to the third heat exchanger for transferring thermal energy to and from the working fluid.

2. The charging system of claim 1, wherein the heat source comprises a waste heat from a PTES generating cycle stored in a waste heat reservoir.

3. The charging system of claim 1, wherein the heat source comprises thermal energy from a separate industrial process.

4. The charging system of claim 1, wherein the working fluid is split into a first portion and a second portion after exiting the second heat exchanger and prior to entering the compressor.

5. The charging system of claim 1, wherein the working fluid is split into a first portion and a second portion prior to entering the recuperator.

6. The charging system of claim 5, wherein the fluid circuit further comprises a fourth heat exchanger wherein the first portion is circulated through the recuperator, the second portion is circulated through the fourth heat exchanger, and wherein the first and second portions are recombined at a location in the fluid circuit between the recuperator and the third heat exchanger.

7. The charging system of claim 1, wherein the fluid circuit further comprises a generating system in the PTES.

8. A generation system in a pumped thermal energy storage ("PTES") system, comprising:
a fluid circuit for the circulation of a working fluid therethrough, the working fluid comprising a first portion and a second portion comingled together, the fluid circuit comprising:
a pump to circulate the working fluid within the fluid circuit, wherein the working fluid enters the pump at a first pressure, and the working fluid exits the pump at a second pressure,
a first heat exchanger through which the working fluid circulates in use;
a second heat exchanger through which the working fluid circulates in use;
a first turbine positioned between the first heat exchanger and the second heat exchanger and wherein the first turbine is for expanding the working fluid to a third pressure, the third pressure greater than the first pressure and less than the second pressure;
a separation location where the working fluid is separated into the first portion and the second portion,
a second turbine positioned between the first heat exchanger and the second heat exchanger and wherein the second turbine is for expanding the first portion of the working fluid to the first pressure;
an auxiliary line through which the second portion of the working fluid circulates between the first turbine and the first heat exchanger;
a third heat exchanger through which the working fluid circulates in use positioned between an outlet of the first turbine and an inlet of a heat rejection heat exchanger, and in fluid communication with the auxiliary line, wherein the third heat exchanger removes thermal energy from the second portion of the working fluid; and the heat rejection heat exchanger positioned between an outlet of the third heat exchanger and an inlet of the first heat exchanger, and in fluid communication with the auxiliary line, wherein the heat rejection heat exchanger removes thermal energy from the second portion of the working fluid;

a high temperature reservoir connected to the first heat exchanger for transferring thermal energy to and from the working fluid;

a low temperature reservoir connected to the second heat exchanger for transferring thermal energy to and from the working fluid; and a waste heat reservoir connected to the third heat exchanger for transferring thermal energy to and from the working fluid.

9. The generation system of claim 8, wherein the waste heat reservoir stores a waste heat from the PTES system.

10. The generation system of claim 8, wherein the heat rejection heat exchanger decreases the temperature of the second portion of the working fluid to within zero to 10 C of an ambient temperature of a surrounding environment.

11. The generation system of claim 10, wherein the heat rejection heat exchanger releases the thermal energy of the second portion of the working fluid to the surrounding environment.

12. The generation system of claim 8, wherein the working fluid is split into the first portion and the second portion after exiting the first turbine.

13. The generation system of claim 8, wherein the auxiliary line includes a second pump positioned between the heat rejection heat exchanger and the first heat exchanger, the second pump for increasing the pressure of the second portion of the working fluid.

14. The generation system of claim 8, wherein the fluid circuit includes a recuperator positioned between the second turbine and the second heat exchanger.

15. A method for charging a pumped thermal energy system, comprising:
circulating a working fluid through a fluid circuit, wherein the fluid circuit comprises a first heat exchanger, a second heat exchanger, a third heat exchanger, and a recuperator positioned between the second heat exchanger and the third heat exchanger connected thereto;
circulating the working fluid through the second heat exchanger, the working fluid entering the second heat exchanger at a first temperature and the working fluid exiting the second heat exchanger at a second temperature;
providing thermal energy from the second heat exchanger to the working fluid;
circulating the working fluid through the recuperator;
circulating the working fluid through the third heat exchanger, wherein:
a waste heat reservoir storing waste heat transfers thermal energy to the working fluid to increase its temperature; and
the working fluid enters the third heat exchanger at a third temperature and the working fluid exits the third heat exchanger at a fourth temperature;
circulating the working fluid through a compressor, the working fluid entering the compressor at the fourth temperature and a first pressure and the working fluid exits the compressor at a fifth temperature and a second pressure; and circulating the working fluid through the first heat exchanger to transfer thermal energy from the working fluid to a high temperature reservoir connected to the first heat exchanger.

16. The method of claim 15, further comprising providing thermal energy from a low temperature reservoir to the second heat exchanger to facilitate thermal energy transfer with the working fluid.

\* \* \* \* \*